US011284170B1

(12) United States Patent
Singh et al.

(10) Patent No.: US 11,284,170 B1
(45) Date of Patent: Mar. 22, 2022

(54) VIDEO PREVIEW MECHANISM

(71) Applicant: Twitter, Inc., San Francisco, CA (US)

(72) Inventors: Baljeet Singh, San Francisco, CA (US); David Regan, Boston, MA (US); Yi Wang, Boston, MA (US); Noah Vihinen, Boston, MA (US)

(73) Assignee: Twitter, Inc., San Francisco, CA (US)

( * ) Notice: Subject to any disclaimer, the term of this patent is extended or adjusted under 35 U.S.C. 154(b) by 461 days.

(21) Appl. No.: 14/754,565

(22) Filed: Jun. 29, 2015

(51) Int. Cl.
*H04N 21/8549* (2011.01)
*H04N 21/472* (2011.01)
*H04N 21/488* (2011.01)
*H04N 21/4788* (2011.01)
*H04N 21/81* (2011.01)
*H04N 21/8547* (2011.01)

(52) U.S. Cl.
CPC ..... *H04N 21/8549* (2013.01); *H04N 21/4788* (2013.01); *H04N 21/47202* (2013.01); *H04N 21/4882* (2013.01); *H04N 21/812* (2013.01); *H04N 21/8547* (2013.01)

(58) Field of Classification Search
CPC ........... H04N 21/2387; H04N 21/4333; H04N 21/47205; H04N 21/47217; H04N 21/6587; H04N 21/8549; H04N 21/47202; H04N 21/4788; H04N 21/4882; H04N 21/812; H04N 21/8547
See application file for complete search history.

(56) References Cited

U.S. PATENT DOCUMENTS

| 7,194,701 | B2 * | 3/2007 | Stavely | G06F 3/04817 |
| | | | | 348/E5.112 |
| 8,949,873 | B1 | 2/2015 | Sandland et al. | |
| 9,003,457 | B2 | 4/2015 | Mulé | |
| 2002/0078444 | A1 * | 6/2002 | Krewin | H04N 7/165 |
| | | | | 725/35 |
| 2002/0120925 | A1 * | 8/2002 | Logan | A23L 2/52 |
| | | | | 725/9 |
| 2007/0253678 | A1 | 11/2007 | Sarukkai et al. | |
| 2008/0292272 | A1 * | 11/2008 | Yamazaki | H04N 5/44591 |
| | | | | 386/244 |
| 2010/0216553 | A1 | 8/2010 | Chudley et al. | |
| 2011/0173570 | A1 | 7/2011 | Moromisato et al. | |
| 2012/0110616 | A1 * | 5/2012 | Kilar | H04N 7/17318 |
| | | | | 725/32 |

(Continued)

OTHER PUBLICATIONS

Non Final Office Action for U.S. Appl. No. 14/754,558, dated Sep. 23, 2016, 30 pages.

*Primary Examiner* — Nasser M Goodarzi
*Assistant Examiner* — Adil Ocak
(74) *Attorney, Agent, or Firm* — Brake Hughes Bellermann LLP

(57) ABSTRACT

A system and method including: a request to display a message stream for a context account of a social media platform may be received by a client device; a preview video including a set of video snippets of a source video may be identified by the client device; automatic playback of the preview video in a playback area displayed inline with the message stream may be initiated; a user input indicating a request to play the source video may be received by the client device; and playback of the source video may be initiated in response to the request for the source video.

20 Claims, 11 Drawing Sheets

(56) References Cited

U.S. PATENT DOCUMENTS

| | | | |
|---|---|---|---|
| 2012/0210203 A1* | 8/2012 | Kandekar | G06F 17/30719 |
| | | | 715/230 |
| 2012/0237183 A1* | 9/2012 | Chen | H04N 7/17318 |
| | | | 386/241 |
| 2012/0278824 A1 | 11/2012 | Patil et al. | |
| 2013/0080242 A1 | 3/2013 | Alhadeff et al. | |
| 2013/0083906 A1* | 4/2013 | Roberts | H04N 7/147 |
| | | | 379/88.13 |
| 2013/0086185 A1 | 4/2013 | Desmarais et al. | |
| 2013/0157699 A1 | 6/2013 | Talwar et al. | |
| 2013/0239140 A1 | 9/2013 | Demirtshian et al. | |
| 2014/0012927 A1 | 1/2014 | Gertzfield et al. | |
| 2014/0053223 A1* | 2/2014 | Vorobyov | G10L 13/00 |
| | | | 725/110 |
| 2014/0143670 A1 | 5/2014 | Swaminathan et al. | |
| 2014/0223482 A1 | 8/2014 | McIntosh et al. | |
| 2014/0278993 A1 | 9/2014 | Massoudi et al. | |
| 2014/0297739 A1 | 10/2014 | Stein et al. | |
| 2014/0321831 A1 | 10/2014 | Olsen et al. | |
| 2015/0154205 A1 | 6/2015 | Grano et al. | |
| 2015/0178282 A1 | 6/2015 | Rajan et al. | |
| 2015/0187339 A1 | 7/2015 | Waddington | |
| 2015/0312184 A1 | 10/2015 | Langholz et al. | |
| 2015/0331856 A1 | 11/2015 | Tanaka et al. | |
| 2015/0348125 A1 | 12/2015 | Schmidt | |
| 2015/0350356 A1 | 12/2015 | Grynspan et al. | |
| 2016/0005135 A1 | 1/2016 | Bokestad | |
| 2016/0029105 A1 | 1/2016 | Newman et al. | |
| 2016/0048989 A1* | 2/2016 | Gabbidon | G06T 11/60 |
| | | | 715/716 |

* cited by examiner

Generation Workflow 300

Generation Workflow 310

Playback Workflow 320

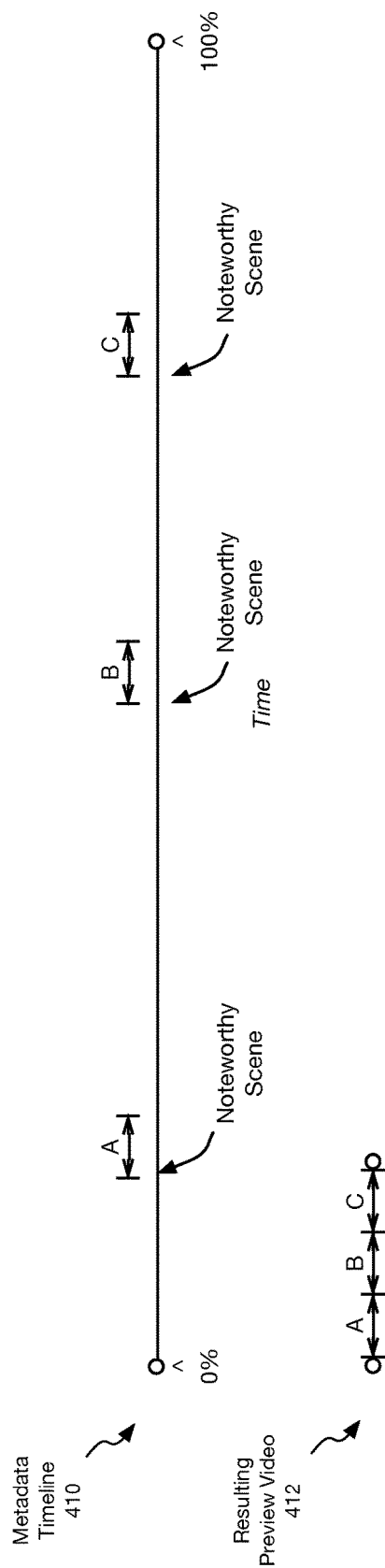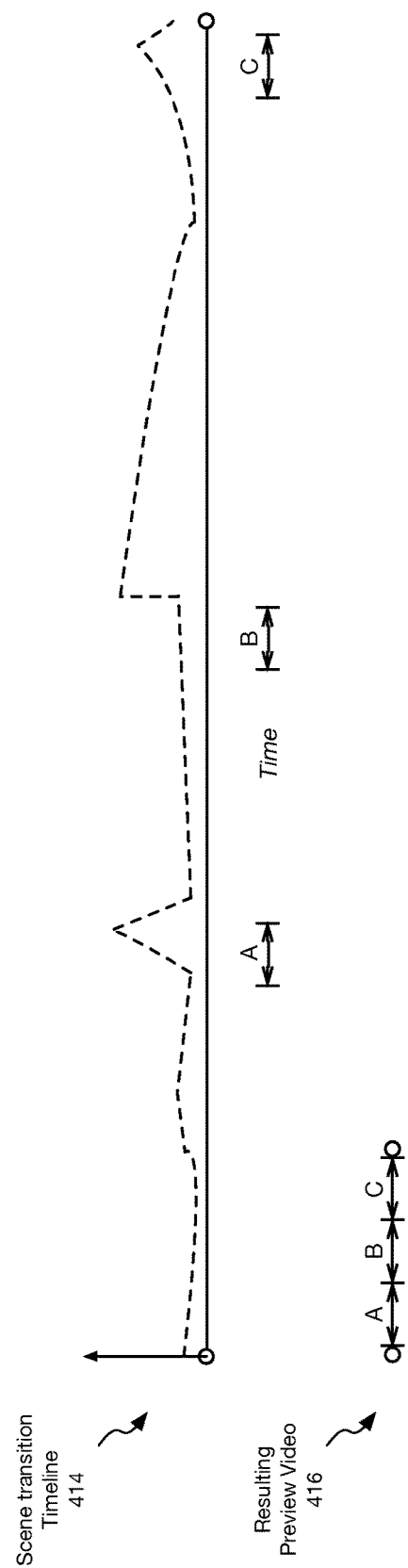

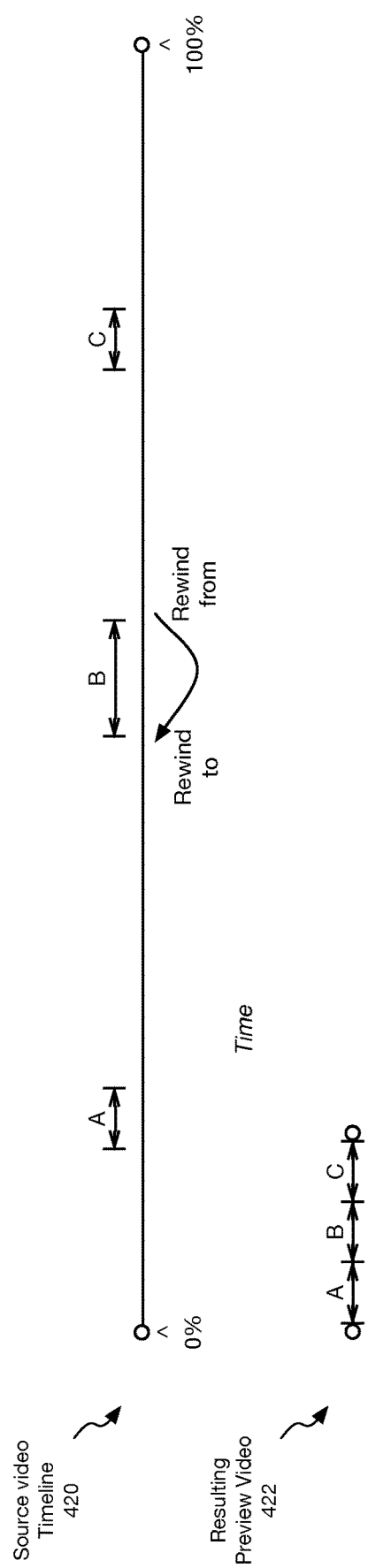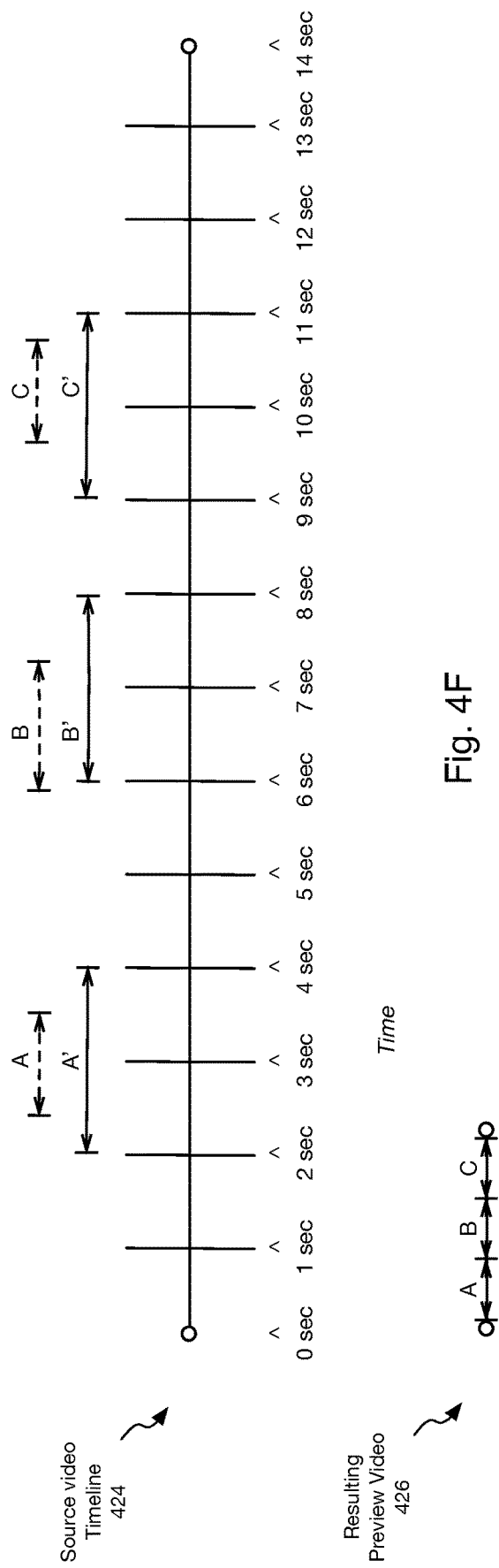

VIDEO PREVIEW MECHANISM

CROSS-REFERENCE TO RELATED APPLICATIONS

This application is related to, and herein incorporates by reference for all purposes, U.S. patent application Ser. No. 14/754,558, filed Jun. 29, 2015, entitled "VIDEO PREVIEW GENERATION", Baljeet Singh.

BACKGROUND

The widespread adoption of sophisticated mobile computing technology, such as smart phones and tablets, has contributed to a major rise in the usage of social media platforms and applications. Thanks to the increasing power of computing devices and extensive mobile networks, social media platforms have become a viable medium for the presentation of a variety of media, including audio and video. A significant issue lies in presenting such media almost instantaneously to users.

SUMMARY

In general, in one aspect, embodiments relate to a system. The system can include: a computer processor; a video output device; a content presentation module executing on the computer processor and configured to cause the computer processor to: receive a request to display a message stream for a context account of a social media platform; display on the video output device a playback area within a portion of the message stream; detect user input indicating a scroll command associated with the playback area; in response to the scroll command, identify a preview video including a set of video snippets of a source video, the source video and the preview video associated with a message included in the message stream; initiate automatic playback of the preview video in the playback area inline with the message stream; detect user input indicating a request to play the source video; and initiate playback of the source video in response to the request for the source video.

Implementations can include one or more of the following items, alone or in combination with other items listed below: The system of claim 1, where the content presentation module is further configured to cause the computer processor to: receive an advertisement by the client device; and display the advertisement prior to playing the source video. The system of claim 1, where the content presentation module is further configured to cause the computer processor to automatically playback the preview video in response to a portion of the playback area becoming visible on a display screen of the client computing device.

In general, in one aspect, embodiments relate to a method. By the method: a request to display a message stream for a context account of a social media platform may be received; a preview video including a set of video snippets of a source video may be identified by the client device; automatic playback of the preview video may be initiated in a playback area displayed inline with the message stream; a user input indicating a request to play the source video may be received by the client device; and playback of the source video may be initiated in response to the request for the source video.

Implementations can include one or more of the following items, alone or in combination with other items listed below: The preview video may be automatically played in response to a portion of the playback area becoming visible on a display screen of the client device. Playback of the preview video in the playback area may be looped until receiving the user input. That the preview video has completed playback while a portion of the playback area is visible on a display screen of the client device may be determined; and the source video may be automatically played in response to the determination. The preview video may be initially played with audio disabled; and the preview video may be subsequently played with audio enabled in response to a subsequent user input. The preview video may be played with captions displayed within the preview video; and the source video may be subsequently played without captions displayed within the source video. A playback command may be received from a user of the client device during playback of the source video; an indication of the playback command and an associated timestamp indicating when the playback command occurred during playback of the source video, may be provided to the social media platform for user engagement analysis to be used, by the social media platform, for generating an additional preview video for subsequent inclusion in message streams of the social media platform based on the indication of the playback command and the associated timestamp. A user engagement with the source video may be received from a user of the client device during playback of the source video, where the user engagement indicates interest in the source video; an indication of the user engagement, and an associated timestamp indicating when the user engagement occurred during playback of the source video, may be provided to the social media platform for user engagement analysis to be used, by the social media platform, for generating an additional preview video for subsequent inclusion in message streams of the social media platform based on the indication of the user engagement and the associated timestamp. A measure of user engagement during playback of the preview video may be tracked; and the measure of user engagement may be provided to the social media platform to be compared with measures of user engagement of other preview videos, by the social media platform, to determine which preview video to subsequently include in message streams of the social media platform.

In general, in one aspect, embodiments relate to a method. By the method: a request to display a message stream for a context account of a social media platform may be received from a client device; a preview video for automatic playback in a playback area inline with the message stream may be provided to the client device, the preview video including a set of video snippets of a source video; a request to play the source video may be received from the client device, where the request is generated by user input at the client device; and the source video may be provided to the client device for playback in response to the request for the source video.

Implementations can include one or more of the following items, alone or in combination with other items listed below: The preview video may be selected for a user of the client device based on demographics of the user. The preview video may be selected for a user of the client device based on user engagement activity indicating user interest in the source video. The preview video may be provided to the client device upon a portion of the playback area becoming visible on a display screen of the client device. An advertisement may be provided to the client device for display prior to playback of the source video. A playback command may be received from a user of the client device during playback of the source video; a timestamp associated with the playback command and indicating when the playback command occurred during playback of the source video may be received; the playback command and the associated timestamp may be stored for user engagement analysis to be used by the social media platform for generating an additional preview video for subsequent inclusion in message streams of the social media platform based on the playback command and the associated timestamp. A user engagement with the source video from the client device during playback of the source video, and a timestamp associated with the user engagement indicating when the user engagement occurred during playback of the source video, may be received, where the user engagement indicates interest in the source video; and the user engagement and the associated timestamp for user engagement analysis may be stored to be used by the social media platform for generating an additional preview video for subsequent inclusion in message streams of the social media platform based on the user engagement and the associated timestamp. A subsequent user input from a first context account associating a second context account with the source video, and an associated timestamp indicating when the subsequent user input occurred in the source video, may be received from the client device; and the association of the second context account and the associated timestamp may be stored. The request to display a message stream may be received from the client device in response to a scroll command associated with the playback area.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 4A-4F show example methods of generating preview videos in accordance with one or more embodiments.

DETAILED DESCRIPTION

Figure 1:
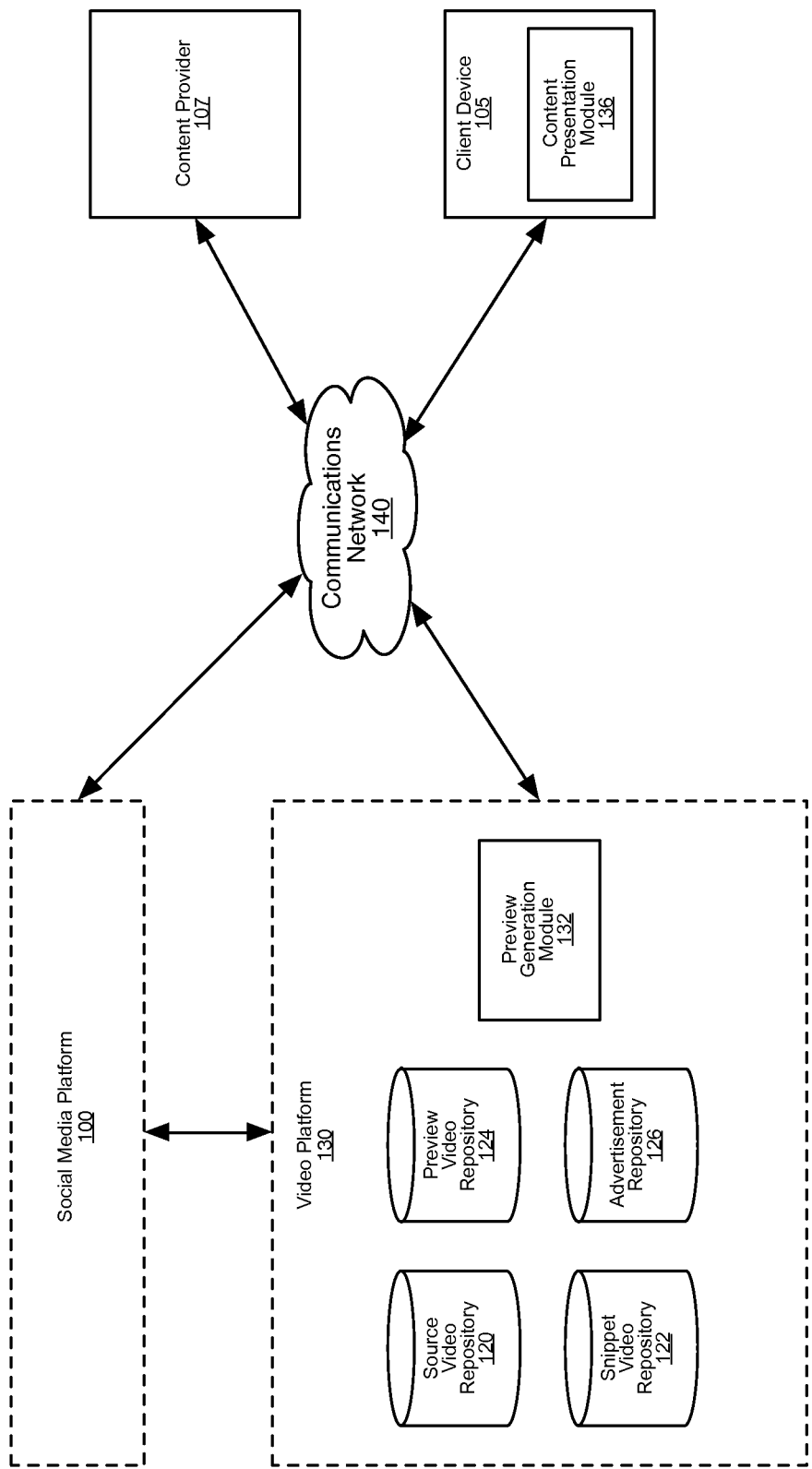
FIG. 1 shows a schematic diagram of a social media platform, a video platform, and a client device in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the present disclosure provide a method and system for generating and providing preview videos for playback on a social media platform. Preview videos may be generated based on source videos by selecting and extracting a set of video snippets from the source video. The video snippets may be selected for extraction by analyzing the source video for scene changes, metadata, user engagement activity, playback commands, or other factors. The video snippets may also be selected based on predefined locations and durations of the snippets within the source video. The selected video snippets are joined to form a preview video, such that the snippets forming the preview video can be played back in a sequential order.

Preview videos may be presented for a user in a message stream of a context account (e.g., of a social media platform). The context account may be associated with the user. The user may request additional portions of a message stream such that a playback area for a video becomes available, indicating a portion of the message stream for playing multimedia content such as video. A preview video may be provided upon the playback area becoming visible to the user, and thereafter automatically played back. The preview video may loop until further user input is received or may play for one or more iterations. An advertisement may be provided to replace the preview video in the playback area or in full screen. The advertisement may be provided and played back upon user interaction with the preview video. After the advertisement completes playback, the source video may be presented within the playback area or in full screen to replace the message stream.

FIG. 1 shows a social media platform 100, a video platform 130, and a client device 105 in accordance with one or more embodiments. The social media platform 100 may include multiple components. Various components of the social media platform 100 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the social media platform 100 is a platform for facilitating real-time communication between one or more entities. For example, the social media platform 100 may store millions of accounts of individuals, businesses, and/or other entities (e.g., pseudonym accounts, novelty accounts, etc.). One or more users of each account may use the social media platform 100 to send messages to other accounts inside and/or outside of the social media platform 100. The social media platform 100 may be configured to enable users to communicate in "real-time", i.e., to converse with other users with a minimal delay and to conduct a conversation with one or more other users during concurrent sessions. In other words, the social media platform 100 may allow a user to broadcast messages and may display the messages to one or more other users within a reasonable time frame so as to facilitate a live conversation between the users. Recipients of a message may have a predefined graph relationship with an account of the user broadcasting the message (e.g., based on an asymmetric graph representing accounts as nodes and edges between accounts as relationships). In one or more embodiments, the user is not an account holder or is not logged in to an account of the social media platform 100. In this case, the social media platform 100 may be configured to allow the user to broadcast messages and/or to utilize other functionality of the social media platform 100 by associating the user with a temporary account or identifier.

As shown in FIG. 1, the video platform 130 may include multiple components including a preview generation module 132, a source video repository 120 (e.g., operable to store source videos), a snippet video repository 122 (e.g., operable to store snippet videos), a preview video repository 124 (e.g., operable to store preview videos), and/or an advertisement repository 126 (e.g., operable to store advertising content). The client device 105 may include a content presentation module 136. Various components of the video platform 130 and/or the client device 105 can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment.

In one or more embodiments, the social media platform 100 and video platform 130 may be coupled with one and/or more client devices 105 via a communications network 140. The communications network 140 provides a means for exchanging content and other data between devices. The communications network 140 can be configured as a wide area network as illustrated in FIG. 1. However, the present principles are applicable to a wide variety of network configurations that facilitate the intercommunication of devices. For example, each of the elements illustrated in FIG. 1 can be implemented in a localized or distributed fashion in a network.

In one or more embodiments, messages, video, and/or other content is delivered to the client device 105 coupled with the network 140 by direct and/or indirect communications with the social media platform 100 and video platform 130. A client device 105 can be any network-enabled device, such as a desktop computer; mobile computer; handheld communications device, e.g. mobile phones, smart phones, and tablets; smart television; set-top box; and/or any other network-enabled computing device. Furthermore, both the social media platform 100 and video platform 130 can concurrently accept connections from and interact with multiple client devices 105.

In one or more embodiments, a content provider 106 coupled with the network 140 communicates directly and/or indirectly with the social media platform 100, video platform 130, and/or client device 105. Content providers are capable of transmitting content for the social media platform 100 and video platform 130. Such content may be, for example, advertising or invitational content, video content, audio content, promotional messages, sponsored material, or any other content that is capable of being received by the social media platform 100 and video platform 130. In one or more embodiments, multiple content providers 106 can transmit content through the network 140, and both the social media platform 100 and video platform 130 can concurrently accept connections from the multiple content providers 106.

Figure 2:
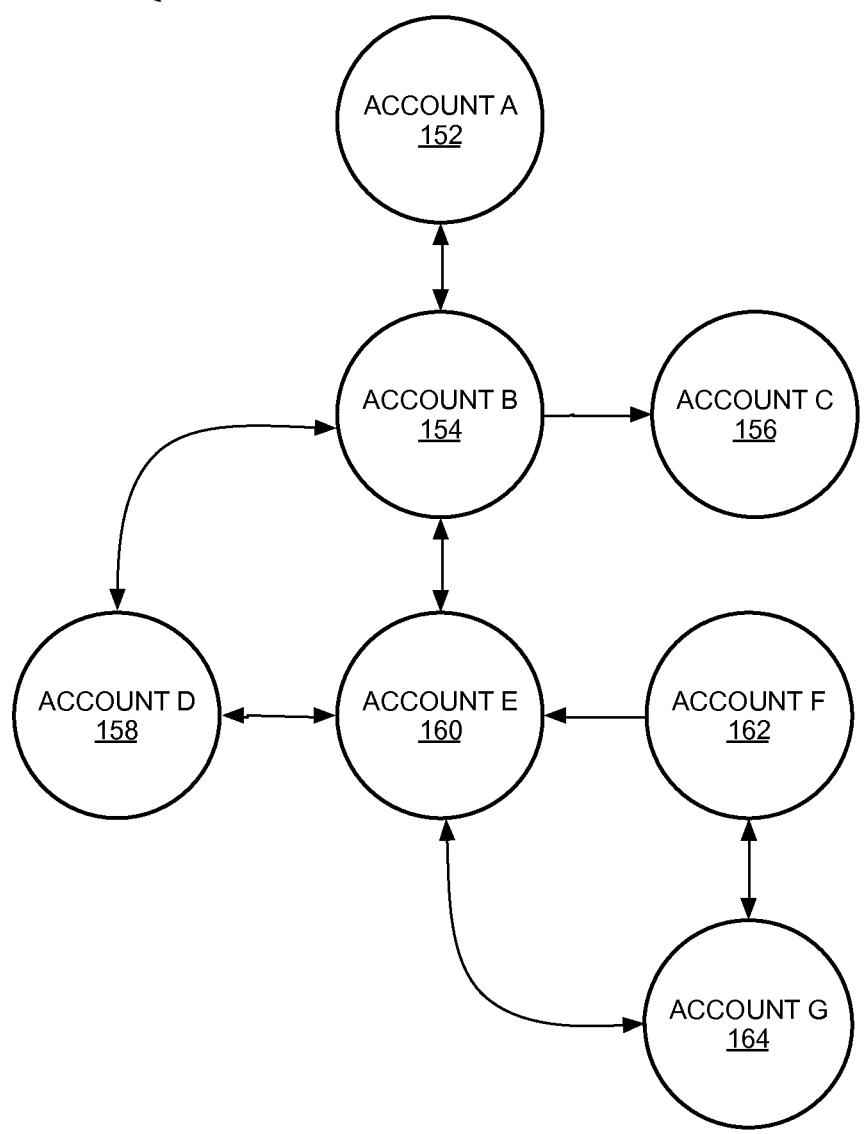
FIG. 2 shows an example depiction of a connection graph in accordance with one or more embodiments.

FIG. 2 shows an example depiction of a connection graph 150 in accordance with one or more embodiments. In one or more embodiments, the connection graph repository 142 is configured to store one or more connection graphs. As shown in FIG. 2, the connection graph 150 includes multiple components including nodes representing accounts of the social media platform 100 (i.e., Account A 152, Account B 154, Account C 156, Account D 158, Account E 160, Account F 162, Account G 164) and edges connecting the various nodes.

The connection graph 150 is a data structure representing relationships (i.e., connections) between one or more accounts. The connection graph 150 represents accounts as nodes and relationships as edges connecting one or more nodes. A relationship may refer to any association between the accounts (e.g., following, friending, subscribing, tracking, liking, tagging, and/or etc.). The edges of the connection graph 150 may be directed and/or undirected based on the type of relationship (e.g., bidirectional, unidirectional), in accordance with various embodiments.

Many social media platforms include functionality to broadcast streams of messages to one or more accounts based at least partially on a connection graph representing relationships between those accounts (see FIG. 2). A stream may be a grouping of messages associated with one or more accounts or can reflect any arbitrary organization of messages that is advantageous for the user of an account. In accordance with various embodiments, a "message" is a container for content broadcasted/posted by or engaged by an account of a social media platform. Messages can be authored by users and can include any number of content types (multimedia, text, etc.).

Video Preview Generation

Returning to FIG. 1, in one or more embodiments, the preview generation module includes functionality to receive a source video for broadcast by a social media platform. For example, the preview generation module 132 may be configured to receive a source video for broadcast by the social media platform 100. The source video may be, for example, a source video file, the location of a source video in a server or repository, or a unique identifier of a source video that can be retrieved. In one or more embodiments, the preview generation module 132 receives the source video from the source video repository 120 as the result of some event or action. The preview generation module 132 may receive the source video from a content provider 107, a client device 105, the social media platform 100, the content presentation module 136, or any other device capable of providing a video. Once received, the preview generation module 132 may store the source video within the source video repository 120.

The source video may be received for broadcast from or by a context account for a message stream of the social media platform. In one or more embodiments, a context account is any account associated with and/or relevant to a request for content. In one example, the context account is an account of a user for which content is requested, such as a user operating the client device 105. In another example, the context account is an account or authoring account of a message from which a link was selected resulting in the request. The request may include an identifier that identifies the context account. A message can be any container for content, e.g. text, multimedia content such as audio or video, or data. A message stream is any grouping of such messages. One example of a message stream is a "timeline" representing a grouping of messages from accounts associated with a user, presented in chronological or reverse chronological order.

In one or more embodiments, the preview generation module includes functionality to extract a set of video snippets from the source video. For example, the preview generation module 132 may be configured to identify and extract a set of video snippets from a source video that was received. Video snippets may be smaller, discrete subsets of the source video. The set of video snippets may be extracted from the source video in a number of ways. The video snippets may be saved as a series of video files that are separate and distinct from the source video file, with each video file designating one video snippet. The video snippets may be saved as a single video file, with the video file containing the set of video snippets arranged in a sequential or predefined fashion.

The preview generation module 132 may also identify which video snippets to extract in a number of ways that will be discussed with reference to FIG. 1. In one or more embodiments, the preview generation module 132 selects the set of video snippets based on predefined timestamps within the source video and/or percentages of duration of the source video. For example, the preview generation module 132 may be configured to select video snippets at the beginning of the source video, the 1-minute timestamp, the 2-minute timestamp, and 10 seconds before the ending of the source video. As another example, the preview generation module 132 may be configured to select video snippets at the 10% duration of the source video, 50% duration of the source video, and 75% duration of the source video. In one or more embodiments, the preview generation module 132 determines the length of each video snippet according to a predefined length, such as 1.5 seconds or 2 seconds.

Figure 4A:
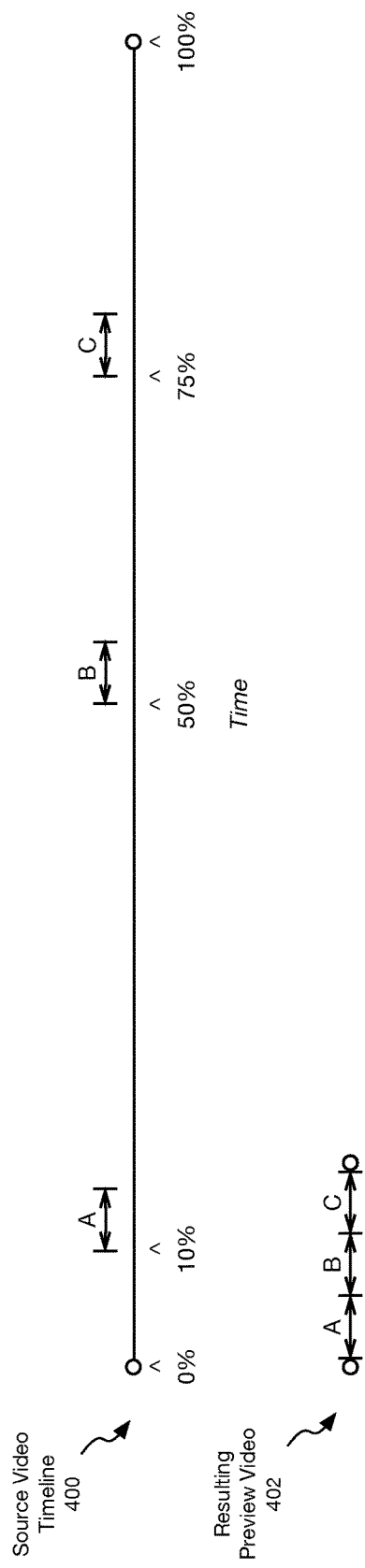

FIG. 4A shows an example method of generating a preview video by extracting video snippets from predefined locations. A source video timeline 400 shows the duration of a source video as a timeline. Predefined timestamps may indicate video snippets should be selected at 10% of the duration of the source video, 50% of the duration of the source video, and 75% of the duration of the source video. Durations for each timestamp may be two seconds long. Snippets may be extracted at the predefined timestamps. For example, Snippet A, Snippet B, and Snippet C may be extracted at 10%, 50%, and 75%, respectively, and are each of a two-second duration. The resulting preview video 402 may be created by joining the Snippets A, B, and C into a single video.

In one or more embodiments, the preview generation module includes functionality to identify closed captioning data associated with the source video. For example, the preview generation module 132 may be configured to identify closed captioning data for a source video that the preview generation module 132 received. The preview generation module 132 may identify a file containing closed captioning data that is bundled with or otherwise associated with the source video. The closed captioning data may include closed caption text for the source video, as well as a set of timestamps denoting when the closed caption text occurs in the source video. The preview generation module 132 may analyze the audio or visual elements of the source video to determine or generate closed captioning data associated with the source video, as well as associated timestamps denoting when the closed caption text occurs in the source video.

In one or more embodiments, the preview generation module includes functionality to identify a set of events and a set of associated timestamps within the source video based on the closed captioning data. For example, the preview generation module 132 may be configured to identify a set of events within the source video, as well as associated timestamps within the source video denoting when the events occur in the source video, based on the closed captioning data that was identified. The preview generation module 132 may identify the set of events and the set of associated timestamps in a number of ways. The preview generation module 132 may analyze the closed captioning data for particular predefined events which are evident from the content of the closed captioning. The preview generation module 132 may be configured to perform some form of natural language processing on the closed captioning data to identify events from a predefined list of events. For example, the preview generation module 132 may parse the content of closed captioning data to determine that a touchdown has occurred within a football game depicted in the source video. The preview generation module 132 may identify the touchdown as an event, and may identify the associated timestamps within the source video that correspond to the parts of the closed captioning data denoting when the touchdown occurred.

In one or more embodiments, the preview generation module includes functionality to rank the identified set of events according to user interest ranking criteria. For example, the preview generation module 132 may determine a score or numerical ranking for each of the events identified from the closed captioning data, according to a set of user interest ranking criteria. User interest ranking criteria may be, for example, a predefined list of recognized events and their level of user interest importance. The preview generation module 132 may assign scores or numerical rankings to the set of events which correspond to the level of user interest importance for the event determined by the user interest ranking criteria. For example, the user interest ranking criteria may assign a touchdown the user interest ranking of "very high", a field goal the user interest ranking of "high", and an offside penalty the user interest ranking of "low". The preview generation module 132 consults this user interest ranking criteria with respect to the identified set of events, and ranks the identified set of events accordingly. For example, the ranking may include a touchdown at the top of the ranking, and an offside penalty at the bottom of the ranking.

In one or more embodiments, the preview generation module includes functionality to select the set of video snippets from the source video based on the ranking of the identified set of events. For example, the preview generation module 132 may be configured to select a set of video snippets from the source video, according to the ranking of the set of events that were identified from the closed captioning data. The preview generation module 132 may select video snippets in the order of the highest ranked first, second highest ranked second, etc. Alternatively, the preview generation module 132 may select video snippets across the ranking of the identified set of events, to include both high-interest events and events of lesser interest within the selected set of video snippets. In one example, a source video depicting a football game may have a ranking of a set of events associated with it. The preview generation module 132 may select snippets based on the ranking, leading, for example, to the set of video snippets depicting the highlights of the football game, such as a series of touchdowns.

In one or more embodiments, the preview generation module includes functionality to identify metadata of the source video that includes event timestamps related to the content of the source video. For example, the preview generation module 132 may be configured to identify metadata associated with the source video, such as one or more separate metadata files associated with the source video, or metadata within the source video file. Such metadata may include event timestamps which designate when events occur in the source video. The metadata may be any data associated with the source video that relates to the content of the source video. For example, metadata may include a transcript of the dialogue or events in the video. The transcript may include timestamps that designate when an event occurs in the source video. For example, a transcript may contain the information that a scoring play occurs in a sports game depicted in the source video at the 45 minute timestamp. The preview generation module 132 may be configured to identify such a transcript and its associated event timestamps.

In one or more embodiments, the preview generation module includes functionality to select the set of video snippets from the source video based on the event timestamps. For example, the preview generation module 132 may be configured to select a set of video snippets to be extracted from the source video that correspond to when events occur in the source video, as denoted by the event timestamps in the metadata. For example, the metadata may be a transcript which notes via event timestamps that significant events in the source video occur at 1 minute, 5 minutes and 15 minutes into the source video. The preview generation module 132 may select a set of three video snippets from the source video, corresponding to the three significant events denoted by the three event timestamps in the metadata. Thus, for example, scoring events in a football game may be selected as video snippets, or key action scenes in an action film.

FIG. 4C shows an example method of preview video generation based on metadata analysis, where the metadata includes event timestamps. A metadata timeline 410 shows three noteworthy events that are marked with event timestamps during the duration of the source video. Video snippets may be selected based on the event timestamps. Snippets A-C may be selected because metadata referenced three separate noteworthy scenes during segments of the source video. A resulting preview video 412 may be created based on joining Snippets A, B, and C.

In one or more embodiments, the preview generation module includes functionality to receive a set of provider video snippet timestamps and an associated set of provider video snippet durations from a content provider of the source video. For example, preview generation module 132 may be configured to receive a set of provider video snippet timestamps, as well as an associated set of provider video snippet durations, from a content provider 107 that has provided a source video. A content provider 107 may send information about a source video to the preview generation module 132. The content provider 107 may send the information about the source video along with the source video, in the source video file or bundled with the source video file. The content provider 107 may send the information before or after the content provider 107 sends the source video.

The information may include a set of video snippet timestamps which the content provider 107 has designated as noteworthy or high-interest timestamps within the source video. The information may also include an associated set of video snippet durations for the timestamps which the content provider 107 has designed as noteworthy or high-interest. For example, the content provider may have created a metadata file for the source video which contains a list of visually interesting or important parts of the source video, with timestamps and durations for those parts. The preview generation module 132 receives the metadata file from the content provider 107.

In one or more embodiments, the preview generation module includes functionality to select the set of video snippets from the source video based on the set of provider video snippet timestamps and the associated set of provider video snippet durations. For example, the preview generation module 132 may be configured to select a set of video snippets to be extracted from the source video that correspond to when events occur in the source video, as denoted by the provider video snippet timestamps and the associated set of provider video snippet durations. For example, the preview generation module 132 may have received a file from a content provider 107 that contains a list of noteworthy video snippet locations within a source video, with timestamps and durations associated with the video snippet locations. The preview generation module 132 may be configured to select video snippets from the source video based on this file from the content provider 107, using the provider video snippet timestamps and durations to select the video snippets for extraction from the source video.

In one or more embodiments, the preview generation module includes functionality to detect a set of visual elements within the video frames of the source video. For example, the preview generation module 132 may be configured to recognize noteworthy visual elements within the video frames of the source video. Such visual elements may include, for example, changes in text elements of the video frames, the appearance of new text within the video frames, changes in a scoreboard during a sports game, the appearance of a noteworthy actor, the appearance of end credits, and more.

The preview generation module 132 may include detection methods that allow for the detection of visual elements in various ways. The preview generation module 132 may include character recognition methods for detecting text, numbers, and other characters within a video. The preview generation module 132 may include methods of transcribing audio within a source video to text format and detecting a set of visual elements within the transcription as displayed within the video frames of the source video. Alternatively, subtitles or captions may already be present within the source video, and the preview generation module 132 may be configured to detect a set of visual elements within the video frame based on the subtitles or captions. The preview generation module 132 may be configured to detect faces within the video frames of the source video and match them with a database of faces. For example, the preview generation module 132 may recognize noteworthy actors, musicians, or athletes as matches for faces within the video frames of the source video. The preview generation module may also detect a set of timestamps and durations associated with the visual elements, denoting when and for how long the visual elements occurred in the source video.

In one or more embodiments, the preview generation module includes functionality to rank the set of visual elements according to user interest ranking criteria. For example, the preview generation module 132 may determine a score or numerical ranking for each of the visual elements identified within the video frames of the source video, according to a set of user interest ranking criteria. User interest ranking criteria may be, for example, a predefined list of recognized visual elements and their level of user interest importance. The user interest ranking criteria, and thereby the resulting ranking, may be based on the user interest of a particular user or a group of users (e.g., a particular demographic of users). The preview generation module 132 may assign scores or numerical rankings to the set of elements that correspond to the level of user interest importance for the visual element determined by the user interest ranking criteria.

For example, the word "replay" might be detected on the screen during some frames of the source video. User interest ranking criteria may indicate that replays are to be ranked highly for user interest. The preview generation module 132 thus may rank the replay element highly relative to other elements that are detected. An additional example may be detecting that a score has changed. The preview generation module 132 may detect, whether through audio transcription or a scoreboard visually changing within the frame, that the score changing is an element of the video. User interest ranking criteria indicates that a change in score is to be highly ranked. The preview generation module 132 thus may rank this element highly relative to other elements.

For an additional example, where the source video is a musical, the preview generation module 132 may have detected when musical portions begin within the video frames based on the beginning of dance routines. The preview generation module 132 may be configured to consult user interest ranking criteria for musicals, which ranks musical numbers as "very high" interest, while simple dialogue between two actors may be ranked as "low" interest. The preview generation module 132 may be configured to rank the visual elements of the musical, such as musical numbers and non-musical portions of the source video, according to the user interest ranking criteria, thereby ranking the musical numbers as high interest.

In one or more embodiments, the preview generation module includes functionality to select the set of video snippets from the source video based on the ranking. For example, the preview generation module 132 may be configured to select a set of video snippets from the source video, according to the ranking of the visual elements that were detected from the video frames of the source video. The preview generation module 132 may select video snippets in the order of the highest ranked first, second highest ranked second, etc. Alternatively, the preview generation module 132 may select video snippets across the ranking of the identified set of visual elements, to include both high-interest visual elements and lesser-interest visual elements within the selected set of video snippets. In one example, a source video depicting a musical may have a ranking of a set of visual elements that were detected, depicting aspects of the musical such as dance routines and dramatic moments. The preview generation module 132 selects the set of video snippets from the source video to be extracted based on this ranking of the visual elements and the associated timestamps denoting when the visual elements occur in the source video.

In one or more embodiments, the preview generation module includes functionality to identify a playback command during playback of the source video and an associated timestamp indicating when the playback command occurred during playback of the source video. For example, the preview generation module 132 may identify a playback command during playback of the source video on a client device 105 by receiving a playback command message or user input from the client device 105. A playback command may be a command that requests a change in the playback of a video. Examples of playback commands may include pause, rewind, fast forward, skip, increase/decrease volume, mute audio, or present captions. Playback commands may be initiated by user input from a user of the client device 105, or may be the result of some other event or action. The preview generation module 132 may be configured to monitor user input on the client device 105 for playback commands during the playback of a source video, and identify an associated timestamp indicating when the user input occurred in the source video. The preview generation module 132 may be configured to receive a playback command message from the social media platform 100 or from the client device 105 containing a playback command and an associated timestamp indicating when the playback command occurred during playback of the source video.

In one or more embodiments, the preview generation module includes functionality to select a video snippet beginning at a time referenced by the playback command and ending at the timestamp in the source video. For example, the preview generation module 132 may be configured to select a video snippet to be extracted from the source video that corresponds to a time referenced by the playback command and a time when the playback command occurred in the source video. For example, the preview generation module 132 may have received the playback command "rewind" from a client device 105, indicating that a user of the client device 105 has selected the rewind playback option during playback of a source video. The preview generation module 132 also receives an associated timestamp, denoting when in the source video the rewind option was selected. The preview generation module 132 also receives a time referenced by the playback command, indicating the time in the video that the user rewound to. The preview generation module 132 selects a video snippet to be extracted from the source video. The video snippet begins at the time referenced by the playback command. The video snippet ends at the moment, or substantially before or after the moment, the rewind command was registered, as denoted by the associated timestamp.

FIG. 4E shows a source video timeline 420 illustrating the duration of a source video. Video snippets may be selected at points throughout the source video timeline 420. Snippets A and C may be selected for extraction from the source video based on one or more methods for selection. Snippet B may be selected because of a user playback command indicating a rewind operation. During the playback of the source video, playback command information indicates that the user rewound from one moment back to another moment. Snippet B is selected with a starting point at the beginning of the rewind, and an ending point at the end of the rewind. Snippet B may be chosen as an appropriate preview video snippet, due to the user's desire to replay that moment, which may indicate that it is an interesting or noteworthy portion. The resulting preview video 422 is created based on joining Snippets A, B, and C.

In one or more embodiments, the preview generation module includes functionality to identify a set of user engagements during playback of the source video and a set of associated timestamps indicating when the set of user engagements occurred during playback of the source video. The set of user engagements may indicate social activity with respect to the source video. User engagement activity can be defined as user engagement and interest for one or more different types of content, separately or in combination with any other user characteristics or demographics. User engagement activity can include user characteristics descriptive of a user's state of mind, including characteristics indicative of how likely a user is to, e.g., click on content, share the content with one or more other users, mention the content to one or more other users, click away from the content, and so on.

User engagement activity may be, for example, indicative of a user's interest in a source video. For example, the preview generation module 132 may be configured to identify a set of user engagements during playback of the source video and a set of associated timestamps indicating when the set of user engagements occurred during playback of the source video. The set of user engagements may include, for example, sharing the source video, mentioning the source video to another user, selecting a "favorite" option for the source video, commenting on the source video, using a hashtag with respect to a source video, or some other form of user engagement. The preview generation module 132 may identify the set of user engagements and the associated timestamps by receiving them as messages or user input signals from the client device 105 or the social media platform 100. The set of user engagements may include the user engagements of many users within the social media platform 100.

In one or more embodiments, the preview generation module includes functionality to calculate a weight of the user engagements per unit time period of the source video. For example, the preview generation module 132 may be configured to calculate how many user engagements have occurred during a given moment in the source video. If 200 users selected a "favorite this video" option during the first minute of the source video, then the preview generation module 132 may calculate a weight of user engagements for the first minute relative to the other minutes of the source video. This may lead to a calculation such as "engagements per minute" or "favorites per minute." This may allow the preview generation module 132 to determine a high percentage of user engagement at a certain point in the source video, thereby deducing that it may be an interesting or noteworthy segment of the source video.

In one or more embodiments, the preview generation module includes functionality to select the set of video snippets from the source video based on the weight of the user engagements during each of the video snippets. For example, the preview generation module 132 may be configured to select the set of video snippets from the source video for extraction based on the calculated weight of the user engagements during each of the video snippets. For example, the preview generation module 132 may select a video snippet for which the "engagements per minute" is high, and choose to extract that video snippet for further use. Thus, the preview generation module 132 may be configured to select video snippets that demonstrate a higher level of user engagement, indicating that the video snippets are more noteworthy or interesting than other video snippets. The preview generation module 132 may be configured to select video snippets that occur moments before the user engagement occurred to account for some delay between an interesting moment in the source video and a user engagement with respect to that interesting moment.

Figure 4B:
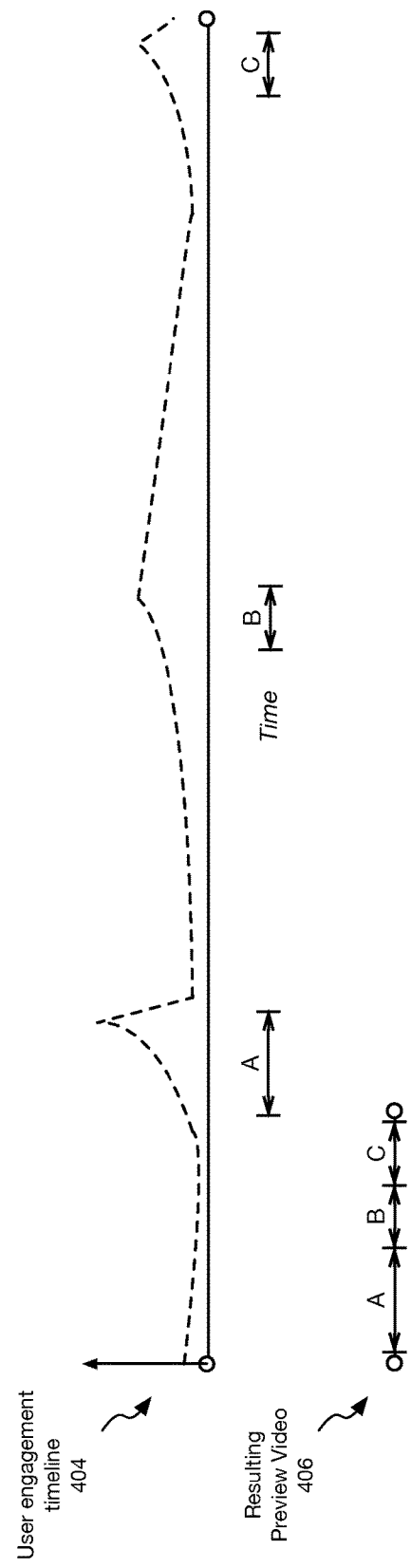

FIG. 4B shows an engagement timeline 404, which depicts user engagement for a source video as a function of time, where the time represents the duration of the source video. The dotted line in the user engagement timeline 404 shows the increase and decrease of user engagement throughout the source video. Video snippets may be selected for extraction based on calculating the weight of user engagement per unit time period of the source video. Snippet A may be selected for an increase in user engagement early on in the source video. The duration of Snippet A is chosen for the period of increased user engagement. Snippet B may be also selected for an increase in user engagement. The duration selected for Snippet B may be shorter than the duration selected for Snippet A, even though the user engagement is far more spread out over the duration of the source video. Thus, snippet length may be variable and may depend on the user engagement data. Snippet C may be selected for a period of increased engagement toward the end of the source video. The resulting preview video 406 may be created by joining the extracted Snippets A, B, and C.

In one or more embodiments, the preview generation module includes functionality to identify a set of high interest timestamps and a set of associated high interest values based on the weight of the user engagements during each of the video snippets. For example, the preview generation module 132 may be configured to identify high interest timestamps and associated high interest values that correspond to the calculated weight of the user engagements during each of the video snippets. The preview generation module 132 may identify the high interest timestamps and associated values by determining which moments in the source video demonstrate the highest amount of user engagement relative to other moments.

In one or more embodiments, the preview generation module includes functionality to identify an advertisement timestamp of the source video from the set of high interest timestamps for inclusion of an advertisement. For example, the preview generation module 132 may be configured to identify an advertisement timestamp for inclusion of an advertisement by analyzing the set of high interest timestamps for an optimized location for the source video to be interrupted by playback of an advertisement. The advertisement may be provided by a content provider 107, and the content provider 107 may provide the preview generation module 132 with guidelines, criteria, preferences, or placement slots which designate or suggest where an advertisement should be included within a source video. The preview generation module 132 may identify an advertisement timestamp from the set of high interest timestamps by analyzing user engagements to determine an advertisement timestamp of particularly high interest to users.

A video may be transcoded or encoded into a video format to compress the video (to achieve a smaller size) and/or to prepare the video for playback. Transcoding may include encoding a set of video frames to create a video segment or chunk (e.g., a group of pictures, or "GOP"). For example, 60 video frames can be encoded to create a video segment. Sets of video frames can also be grouped to create a video segment. For example, a first set of 30 encoded video frames can be grouped with a second set of 30 encoded video frames to form a video segment. While the video segments may be discrete items, they may be played back sequentially in chronological order such that the original video is displayed with continuous playback.

Different video compression techniques are possible. For example, an I-frame ("Intra-coded picture") is in effect a fully specified picture, the compression of which is independent from other frames. However, P-frames and B-frames hold only part of the image information, so they need less space to store than an I-frame and thus improve video compression rates. For example, a P-frame ("Predicted picture" or "delta-frames") holds only the changes in the image from the previous video frame. For example, in a scene where an object moves across a stationary background, only the object's movements need to be encoded. The unchanging background pixels do not need to be stored in the P-frame, thus reducing the amount of size needed. A B-frame ("Bi-predictive picture") requires even less size by using differences between the current frame and both the preceding and following frames to specify its content.

In one or more embodiments, the preview generation module includes functionality to identify a set of transcoded (or encoded) video segments corresponding to the source video. The video segments may be preexisting as a result of a previously performed video transcoding or encoding operation.

In one or more embodiments, the preview generation module includes functionality to select the set of video snippets from the source video based on the set of transcoded video segments. For example, the video snippet portions may correspond with one or more preexisting transcoded video segment portions. As a result, the video snippets may be selected from the transcoded video segments. However, the video snippets may not align with the starting points, ending points, or duration of the transcoded video segments.

In one or more embodiments, the preview generation module includes functionality to modify a length of the set of video snippets to correspond to a length of the set of transcoded video segments. The preview generation module 132 may modify the length of each video snippet such that the length of the video snippet aligns with the length of the one or more corresponding transcoded video segments. For example, the modification may occur by "rounding down" a starting time of a video snippet to align with the starting time of a transcoded video segment and/or "rounding up" an ending time of a video snippet to align with the ending time of a transcoded video segment. If both the timestamps and the durations of the set of video snippets are modified to be the same or substantially the same as the timestamps and durations of the set of transcoded video segments, then the existing video snippets may be used to represent the set of video snippets. As a result, additional transcoding operations of the source video to produce additional video segments based on the video snippets are avoided.

FIG. 4F shows an example method of identifying transcoded video segments, selecting a set of video snippets, and modifying the length of video snippets to correspond to the length of transcoded video segments. A source video timeline 424 shows a timeline for a source video. The source video timeline 424 shows 14 seconds of the source video (although more of the source video may exist). The source video timeline 424 may comprise a set of transcoded video segments. For example, segments in 1-second durations. It should be noted that while equal length segments are shown, variable length segments are possible. The video segments are illustrated by the periodic lines within the source video timeline 424. In this example, the first video segment starts at the 0-second timestamp and ends at the 1-second timestamp, the second video segment starts at the 1-second timestamp and ends at the 2-second timestamp, and so on.

Video segments may be identified based on the video snippets A, B, and C (the original snippet portions illustrated by dotted lines). In this example, the three video snippets do not align with the timestamps and durations of the transcoded video segments. For example, video snippet A may start at 2.4 seconds and end at 3.5 seconds into the source video, which does not align with the transcoded video segments that are from 2-3 seconds and 3-4 seconds into the source video. Similarly, video snippet B may be from 5.9-7.5 seconds into the source video, which does not align with the transcoded video segments that are from 5-6, 6-7, and 7-8 seconds into the source video. Finally, video snippet C may be from 9.6-10.8 seconds into the source video, which does not align with the transcoded video segments that are 9-10 and 10-11 seconds into the source video.

The lengths of the selected video snippets A, B, and C may then be modified to correspond to the transcoded video segments. This may include, for example, rounding a starting timestamp down to align with the starting timestamp of a transcoded video segment and rounding an ending timestamp up to align with the ending timestamp of a transcoded video segment. The modified video snippet lengths are illustrated by the solid lines labeled A', B', and C'. In this example, the starting point of video snippet A is rounded down to start at the timestamp of 2 seconds into the source video, which is the same as the starting timestamp of a transcoded video segment. The ending point of video snippet A is also rounded up to end at the timestamp of 4 seconds, which is the same as the ending timestamp of a transcoded video segment. However, the starting point may be rounded up and/or the ending point may be rounded down. For example, the starting point of video snippet B is rounded up to start at the timestamp of 6 seconds into the source video, which is the same as the starting timestamp of a transcoded video segment. The resulting preview video 426 may then be generated from the modified video snippets, such that additional encoding or transcoding steps are avoided.

In one or more embodiments, the preview generation module includes functionality to extract the set of video snippets based on at least one of user demographics and user engagement activity for a user. For example, the preview generation module 132 may be configured to extract the set of video snippets based on user demographics for a user on a client device 105 or social media platform 100. User demographics may be information that describes a user in terms of a variety of identifying or defining criteria. Demographics can define characteristics of users that may be targeted by content, the content providers 107, or the social media platform 100. Examples of user demographics include age, gender, ethnicity, location, language, interests, and other user characteristics. For example, the preview generation module 132 may extract the set of video snippets based on the age of the user of the client device 105. A different set of video snippets may be extracted for users in the age demographic of 18-22 than for users in the age demographic of 35-39.

In one or more embodiments, the preview generation module 132 extracts the set of video snippets based on user engagement activity that is identified for a user of the client device 105. User engagement activity can define user engagement and interest for one or more different types of content, separately or in combination with any other user characteristics or demographics. User engagement activity can include user characteristics indicative of how likely a user is to, e.g., click on content, share the content with one or more other users, mention the content to one or more other users, click away from the content, and so on. User engagement activity may be, for example, indicative of a user's interest in a preview video. The preview generation module 132 may extract the set of video snippets according to how often a user of a client device 105 has played back similar videos, or how often a user has stopped a video early on in playback.

In one or more embodiments, the preview generation module includes functionality to determine a category of the source video from a set of video categories. A category of a video may be, for example, a genre, style, mood, or format of the video. For example, the preview generation module 132 may be configured to determine a category of the source video from a set of video categories by identifying metadata associated with the source video. The metadata may list a genre or other category of the source video. The preview generation module 132 may determine a category of the source video by analyzing visual elements, audio elements, closed captioning, or other aspects of the source video for aspects which may place it into one or more categories from the set of video categories.

In one or more embodiments, the preview generation module includes functionality to select the set of video snippets from the source video based on the category of the source video. For example, the preview generation module 132 may be configured to select the set of video snippets from the source video for extraction, based on the determined category of the source video. The preview generation module 132 may select the set of video snippets by analyzing which snippets are noteworthy for the determined category associated with the source video. The preview generation module 132 may identify events that occur in the source video through various methods, such as analyzing visual elements of the source video, or analyzing text or closed captioning data associated with the source video. The preview generation module 132 may then select video snippets pertaining to the identified events that are specific to the determined category. For example, if a source video has a determined category of "travel documentary", then the preview generation module 132 may select video snippets that are identified to depict famous landmarks or noteworthy locations within cities.

In one or more embodiments, the preview generation module includes functionality to analyze a set of video frames of the source video to detect a set of video transition timestamps. For example, the preview generation module 132 may be configured to analyze the video frames within the source video to determine when video transitions are placed within the source video, and to detect a set of video transition timestamps associated with the video transitions. Video transitions are scenes or segments that may facilitate a transition to a different scene. Video transitions may be, for example, black scenes or crossfades. The preview generation module 132 may be configured to detect transitions using various methods of analyzing the set of video frames. The preview generation module 132 may determine that a significant change in pixels or color has occurred between frames. For example, the preview generation module 132 may determine that a 75% change in pixels or in average color has occurred between two frames, implying that a transition has likely occurred. The preview generation module 132 may also, for example, determine that there was a 20% change in pixels over the last five second, followed by a 50% change, which makes it likely that a video transition has occurred at that moment.

In one or more embodiments, the preview generation module includes functionality to select the set of video snippets from the source video based on the set of video transition timestamps. For example, the preview generation module 132 may be configured to select the set of video snippets from the source video for extraction, based on the video transition timestamps associated with determined video transitions in the source video. The preview generation module 132 may select the set of video snippets by identifying the exact moments when video transitions occur, denoted by the video transition timestamps, and selecting video snippets before or after those video transitions. For example, an introductory portion of a source video may include a video transition in which the screen fades in from black to the first scene. The preview generation module 132 may analyze these frames to detect the scene transition, then select a set of video snippets to begin as soon as the transition is complete. In this manner, none or a minimal amount of the fading in from black transition will appear in the set of video snippets.

FIG. 4D shows a scene transition timeline 414 illustrating scene transition data over time. In the scene transition timeline 414, Snippet A may be selected for extraction during a period where a transition is occurring. A scene change may be detected based on the increase in black color during the segment, indicating a fade to black that may be a transition. Snippet B is similarly selected for extracting during a period where a transition is imminent. Snippet B may be positioned prior to the transition to show a moment just before the detected scene change. Finally, Snippet C may be selected for a scene change towards the end. The resulting preview video 416 may be created based on joining Snippets A, B, and C.

In one or more embodiments, the preview generation module includes functionality to join a subset of the video snippets to form a preview video. For example, the preview generation module 132 may be configured to join a subset of the extracted video snippets by combining the video snippets into a single preview video, such that the video snippets can be played in continuous order. In one or more embodiments, the preview video may be include a single, continuous video snippet rather than several video snippets. The preview generation module 132 may select a subset of the video snippets by choosing the first snippets to fill up an allotted amount of time designated for a preview video. The preview generation module 132 may select a subset of the video snippets by ranking the video snippets in some way, or performing some analysis of the video snippets. The preview generation module 132 may join the video snippets by creating a video container for the preview video and placing the snippets within the video container. The preview generation module 132 may join the video snippets by placing separate video snippet files in a playback area to be played back-to-back without interruption.

A playback area may be a portion of a message stream where content may be displayed. The playback area may visually appear within a message stream in a variety of ways that designate that content is playing or is to be played. For example, the playback area may appear as an inline rectangle in which video appears, or an audio bar with playback options for playing audio content. The content may be any form of content which can exist within a message stream, e.g. video, audio, text, an interactive widget or application, an image, graph, etc.

Figure 3A:
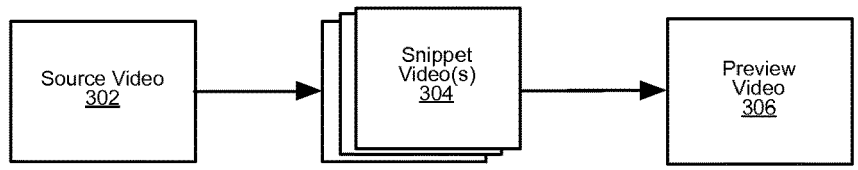
FIGS. 3A-3C show example workflows in accordance with one or more embodiments.

FIG. 3A shows an example workflow 300 for preview generation, illustrating the joining of multiple video snippets to form a preview video. A set of snippet videos 304 may be extracted from a source video 302. A preview video 306 may be then created by joining the set of snippet videos 304 to form the single preview video 306. The snippet videos may be joined by combining the video snippets into a single preview video 306, such that the snippets 304 can be played in a continuous and sequential order.

Figure 3B:

FIG. 3B shows another example workflow 310 for preview generation. In this example, multiple preview videos are created by joining the snippet videos. As in FIG. 3A, a set of snippet videos 304 may be extracted from the source video 302. A set of preview videos 316 may be then created by joining subsets of the set of snippet videos 304. A set of snippet videos 314 may be used to generated multiple preview videos 316, which may be used for multiple purposes. For example, different preview videos 316 may be provided to different users with different demographic characteristics. In another example, different preview videos 316 may be provided to determine the most engaging preview video of preview videos 316 (e.g., "A/B testing"). Thus, multiple subsets of snippets may be identified from a single set of snippet videos 304 and joined to create multiple preview videos 316.

Returning to FIG. 1, in one or more embodiments, the preview generation module includes functionality to receive, from a client device, a request for content for an account of the social media platform. For example, the preview generation module 132 may be configured to receive a request from client device 105 for content for an account of the social media platform 100. The request can take the form of a message, signal, or transfer of data from the client device 105 to the preview generation module 132. The request may indicate, for example, that a user of the client device 105 has opened a social media application that is set to display content for a context account associated with that user. In one or more embodiments, the request for content can include a user event, such as opening an application, clicking, scrolling, touching, or other input from a user operating the client device 105.

In one or more embodiments, the preview generation module includes functionality to provide the preview video for automatic playback in a playback area displayed by the client device, where the playback area is displayed inline with a message stream of the account. For example, the preview generation module 132 may be configured to provide the preview video to the client device 105, in response to the request from the client device 105 for content for an account of the social media platform 100. In one or more embodiments, providing the preview video includes providing a location of the preview video within the preview video repository 124. In one or more embodiments, the preview generation module 132 provides a stream of the preview video to the client device 105. In other embodiments, the preview generation module 132 provides a download or partial download of the preview video to the client device 105. The content can appear inline within a display of the message stream, within a playback area.

In one or more embodiments, the preview generation module includes functionality to join a second subset of the video snippets to form a second preview video. For example, the preview generation module 132 may be configured to join a second subset of the video snippets to form a second preview video, by combining the video snippets into a single preview video, such that the second subset of video snippets can be played in a continuous and/or sequential order. In one or more embodiments, the preview video may include a single, continuous video snippet rather than several video snippets.

The preview generation module 132 may select a second subset of the video snippets in a variety of ways. The preview generation module 132 may select a second subset of the video snippets by ranking the video snippets or performing analysis of the video snippets. The preview generation module 132 may join the video snippets by creating a video container for the second preview video and placing the snippets within the video container. The preview generation module 132 may join the video snippets by placing separate video snippet files in a playback area to be played back-to-back without interruption (besides, e.g., crossfades and so on). In one or more embodiments, the second subset of the video snippets may partially overlap with the first subset of the video snippets in the selection of video snippets to be used.

In one or more embodiments, the preview generation module includes functionality to provide the preview video and the second preview video for automatic playback in a playback area inline with a set of message streams for a set of context accounts. For example, the preview generation module 132 may be configured to provide the preview video to a first user of a first client device 105 who is using a first context account. The preview generation module 132 may be configured to also provide the second preview video to a second user of a second client device 105 who is using a second context account. The preview video and the second preview video may be provided for automatic playback, with no user input, event, or action necessary to trigger playback. The preview video and the second preview video may be provided within playback areas inline with the set of message streams for the set of context accounts, on the respective client devices 105 for each context account.

In one or more embodiments, the preview generation module includes functionality to compare user engagement activity of the preview video with user engagement activity of the second preview video. For example, the preview generation module 132 may be configured to analyze user engagement activity for the preview video, analyze user engagement activity for the second preview video, and determine which user engagement activity is the greater of the two. User engagement activity may be, for example, indicative of users' interest in a preview video. The preview generation module 132 may compare the preview video and the second preview video according to how often a user of a client device 105 has played back similar videos, or how often a user has stopped a video early on in playback.

In one or more embodiments, the preview generation module includes functionality to select the preview video with greater user engagement activity for subsequent inclusion in message streams. For example, the preview generation module 132 may be configured to select either the preview video or the second preview video, but not both, for subsequent inclusion in message streams. The selection may be based on the comparison of user engagement activity of the preview video and second preview video, which determined the greater user engagement activity of the preview video and second preview video. In one or more embodiments, selecting the preview video may include placing the preview video within the preview video repository 124 and discarding the non-selected preview video.

In one or more embodiments, the preview generation module includes functionality to receive, from the client device, a request for the full content of the source video for playback for the context account of the social media platform. For example, the preview generation module 132 may be configured to receive a request from the client device 105 for the source video for playback for a context account of the social media platform 100. The request can be in the form of a message, signal, or transfer of data from the client device 105 to the preview generation module 132. The request may indicate, for example, that a user of the client device 105 has opened a social media application that is set to display content for a context account associated with that user. In one or more embodiments, the request for content can include a user event, such as opening an application, clicking, scrolling, touching, or other input from a user operating the client device 105.

In one or more embodiments, the preview generation module includes functionality to provide an advertisement to be displayed in the playback area before providing the source video. For example, the preview generation module 132 may be configured to provide an advertisement for display in the playback area, upon receiving a request for the source video from the client device 105. The advertisement can be provided for display after the display of a preview video has completed and before the source video is to be displayed. This allows for the display of an advertisement as a "pre-roll" before the main content, the source video, is displayed. The advertisement provided by the preview generation module 132 may be video, audio, text, image, interactive software, or some combination of the foregoing. The preview generation module 132 provides the advertisement within the same playback area which displayed the preview video, inline within a message stream.

In one or more embodiments, the preview generation module includes functionality to provide the source video for playback after receiving a confirmation message confirming that the advertisement was displayed. For example, the preview generation module 132 may be configured to provide the full source video that the preview video was a subset of for playback and display on the client device 105. The preview generation module 132 may provide the source video upon receiving a confirmation message confirming that the advertisement was displayed on the client device 105. Upon the advertisement being displayed, the preview generation module 132 provides the source video in the same playback area which displayed the advertisement.

In one or more embodiments, the preview generation module includes functionality to provide an advertisement for playback at the advertisement timestamp during playback of the source video. For example, the preview generation module 132 may provide the advertisement for playback and display on the client device 105 at a specified moment during the playback of the source video, denoted by an advertisement timestamp. The preview generation module 132 may be configured to determine and identify an advertisement timestamp for advertisement placement, and provide the advertisement to the client device 132 at the advertisement timestamp during the source video. The source video may be interrupted or paused while the playback of the advertisement occurs. This allows for a "mid-roll" advertisement that can be played at some point during the viewing of a source video.

In one or more embodiments, the preview generation module includes functionality to suspend a providing of the source video for the client device at the advertisement timestamp. For example, the preview generation module 132 may be configured to instruct the client device 105 to pause a playback of the source video on the client device 105 when the advertisement timestamp is reached. The instruction to pause or suspend playback may be in the form of a message, signal, or other transmission of data to the client device 105 or the social media platform 100.

In one or more embodiments, the preview generation module includes functionality to provide the advertisement at the advertisement timestamp in the source video before resuming the providing of the source video. For example, the preview generation module 132 may provide the advertisement for playback and display on the client device 105 at the advertisement timestamp during the source video. The source video may be interrupted or paused while the playback of the advertisement occurs. The playback of the source video may then be resumed once the advertisement has completed playback.

In one or more embodiments, the preview generation module includes functionality to determine an advertisement cost based on the high interest value associated with the advertisement timestamp. For example, given an advertisement timestamp identified from the list of high interest timestamps, the preview generation module 132 may be configured to calculate an advertisement cost, based on the high interest value associated with the advertisement timestamp. The advertisement cost may be a monetary amount calculated to correspond to the level of user interest in a particular placement for an advertisement. For example, a placement with high interest, denoted by an advertisement timestamp with a high associated interest value, may result in a calculation of a high advertisement cost. Conversely, a placement with lesser interest, denoted by an advertisement timestamp with a lesser associated interest value, may result in a calculation of a lower advertisement cost. The advertisement cost may be communicated or offered to a content provider or other party associated with the advertisement.

Video Preview Presentation

In one or more embodiments, the content presentation module includes functionality to receive a request to display a message stream for a context account of a social media platform. In one or more embodiments, the content presentation module may be included within the video platform 130, the client device 105, or both in some capacity. For example, the content presentation module 136 is configured to receive a request by the client device 105 to display a message stream for a context account of the social media platform 100. The request can take the form of a message, signal, or transfer of data from the client device 105 to the content presentation module 136. The request may indicate, for example, that a user of the client device 105 has opened a social media application that is set to display a message stream for a context account associated with that user.

In one or more embodiments, the request to receive a message stream is automatically sent to the content presentation module 136 upon the triggering of some user event. A user event can be, e.g., the opening of an application on the client device 105, or a scrolling, clicking, or touching gesture indicating that a message stream should be displayed for a context account. In one or more embodiments, a portion of a message stream for a context account has already been displayed, and the request is made for receiving an additional portion or portions of the message stream.

In one or more embodiments, the display of the message stream that the client device 105 has requested includes at least a portion where content is displayed within the message stream. The content can appear inline within a display of the message stream, within a playback area.

In one or more embodiments, the content presentation module includes functionality to display a playback area comprising at least a portion of the message stream. A playback area may be area within a message stream that allows for the playback of some form of multimedia content. For example, the content presentation module 136 may be configured to display, on the display screen of the client device 105, a rectangular-shaped playback area within a message portion of a message stream. This playback area may be able to display, for example, a video for playback on the client device 105. The playback area may be partially or fully displayed. In some embodiments, only a portion of the playback area may be displayed on the client device 105.

In one or more embodiments, the content presentation module includes functionality to detect user input indicating a scroll command associated with the playback area. A scroll command may be a command from a user of the client device 105 that is related to the scrolling of content on the display screen (e.g., for the purpose of revealing further portions of that content). For example, the content presentation module 136 may be configured to detect user input indicating a scroll command, by receiving a message or signal from the client device 105 that a scroll command has been received via user input. The scroll command may be, for example, a command from the user indicating a desire to scroll down within a message stream to reveal more messages and content that are hidden from the user.

In one or more embodiments, the content presentation module includes functionality to identify a preview video including a set of video snippets of a source video. The content presentation module 136 may identify the preview video in response to detecting a scroll command. For example, upon receiving the scroll command associated with the playback area, the content presentation module 136 is configured to identify a preview video for a client device 105. The preview video may include, or may be made up of, a set of video snippets of a source video. The source video and the preview video may be associated with a message included within the message stream. This association may be represented by, for example, metadata, server address, repository location, or unique identifier indicating that the message is associated with the source video or preview video.

In one or more embodiments, the preview video is a subset of the source video, and the set of video snippets is made up of individual, discrete portions or segments of the source video. The video snippets can be arranged in a sequential or non-sequential order to make up the preview video. In one or more embodiments, playback of the preview video may include each of the video snippets making up the preview video being played in order, without pause or interruption. In one or more embodiments, the preview video may be a single continuous video snippet of the source video.

The source video may be any form of video that can be displayed on the client device 105 or through the social media platform 100. In one or more embodiments, the source video is a prerecorded video. In one or more embodiments, the source video is live broadcast media.

In one or more embodiments, preview audio may be provided rather than preview video. In one or more embodiments, source audio may be provided rather than source video. It should be appreciated that all instances of video mentioned within the application may be replaced by audio versions of those elements.

In one or more embodiments, the content presentation module 136 identifies the preview video by receiving identifying information about the preview video. In one or more embodiments, identifying information for the preview video may be sent from the preview generation module 132, from the content presentation module 136, or from the social media platform 100. Identifying information can include one of, or any combination of, a content type of the preview video, a server location of the preview video, a unique identifier, a name, a server address, a repository location, or any other information that can be used to identify the preview video.

In one or more embodiments, the content presentation module includes functionality to receive, from a client device, a request to display a message stream for a context account of a social media platform. For example, the content presentation module 136 may be configured to receive a request from client device 105 to display a message stream for a context account of the social media platform 100. The request can take the form of a message, signal, or transfer of data from the client device 105 to the content presentation module 136. The request may indicate, for example, that a user of the client device 105 has opened a social media application that is set to display a message stream for a context account associated with that user. In one or more embodiments, the request to display the message stream can include a user event, such as opening an application, clicking, scrolling, touching, or other input from a user operating the client device 105.

In one or more embodiments, the request to display a message stream is received from the client device in response to a scroll command associated with the playback area. For example, the content presentation module 136 may receive a request to display a message stream for a context account of the social media platform 100. The request indicates that the request was received in response to a user input from the client device 105 associated with a scrolling operation of a display of the message stream, such that a portion of the playback area would appear or become visible. The content presentation module 136 has thus received an indication that the request to display a portion of the message stream is in relation to a scrolling operation that reveals a portion of the playback area on the display screen of the client device 105.

In one or more embodiments, the content presentation module includes functionality to provide a preview video for automatic playback in a playback area inline with the message stream, the preview video including a set of video snippets of a source video. For example, the content presentation module 136 is configured to provide a preview video to the client device 105. The content presentation module 136 may provide the preview video by receiving or locating identifying information for the preview video, and providing the preview video for playback within a playback area inline with the message stream. The content presentation module 136 receives identifying information for the preview video from the client device 105, the preview generation module 132, the content presentation module 136, and/or the social media platform 100. Identifying information can include, e.g., a repository location for the preview video in the preview video repository 124, a server address for the preview video, a unique identifier, a name, or any other identifying information that can be used for identifying the preview video. The source video and the preview video may be associated with a message included in the message stream. This association may be represented by, for example, metadata, server address, repository location, or unique identifier indicating that the message is associated with the source video or preview video.

In one or more embodiments, the content presentation module 136 uses the identifying information for the preview video to retrieve the preview video from the preview video repository 124. For example, the content presentation module 136 receives identifying information about the preview video that uniquely identifies the preview video within the preview video repository 124. The content presentation module 136 may be further configured to place the preview video for playback within a playback area inline within the message stream. A playback area may be designated within an inline portion of the message stream that a user of the client device 105 is viewing or about to view. The content presentation module 136 may place the retrieved preview video within the playback area such that it is in a condition for automatic playback or manual playback by the client device 105.

In one or more embodiments, the preview video is placed within the playback area such that it is part of a continuous, integrated series of components within the message stream, alongside message text, images, and/or other components. In one or more embodiments, the preview video plays within a playback area that is separated from the other components of the message stream, but is still inline within the message stream. In one or more embodiments, the preview video is placed in an area separate from the message stream, or replaces the message stream in whole or in part. In one or more embodiments, the preview video is placed within a separate pop-up window, or is presented full-screen.

Figure 3C:

FIG. 3C shows an example playback workflow 320. Upon a scrolling operation causing a playback area to become at least partially displayed, a preview video 322 may be displayed and automatically played back. The preview video 322 may be played back in the playback area, inline with a message stream that the user is viewing. The preview video 322 may continue looping while the playback area is visible and the preview video 322 is displayed.

Upon clicking on, or otherwise interacting with, the preview video, an advertisement 324 may be displayed (e.g., in the playback and/or replacing the preview video 322) and then immediately played back. The advertisement 324 may be, for example, an image, a video, an audio track, or any other form of advertisement. In one or more embodiments, the advertisement 324 appears within the playback area, inline within the message stream.

Once the advertisement 324 has finished playing, a source video 326 may be displayed (e.g., in the playback area and/or replacing the advertisement 324). The source video 326 may be the full video of which the preview video 322 represents. The source video 326 may play back within the playback area as soon as the source video 326 is displayed.

Returning to FIG. 1, in one or more embodiments, the content presentation module 136 includes functionality to select the preview video for a user of the client device based on at least one of user demographics and user engagement activity. For example, the content presentation module 136 may be configured to select the preview video from the preview video repository 124 according to one or more specific user demographics which are identified for a user of the client device 105.

In one or more embodiments, the content presentation module 136 selects the preview video from the preview video repository 124 according to user engagement activity that is identified for a user of the client device 105. For example, the content presentation module 136 may be configured to select the preview video from the preview video repository 124 according to at least one piece of user engagement activity related to a user of the client device 105 associated with the context account and the message stream.

In one or more embodiments, the content presentation module includes functionality to provide the preview video to the client device when a portion of the playback area becomes visible on a display screen of the client device. For example, the content presentation module 136 may be configured to receive a message, signal, or indication from the client device 105 that a portion of the playback area is visible on the client device. The playback area may be visible when, for example, a user scrolls or drags a message stream down on the client device 105 to reveal more of the message stream, until a portion of the playback area becomes visible on the message stream. The playback area may also become visible when a user clicks on a link or other element of the message stream that leads to the playback area becoming visible. When the client device 105 indicates to the content presentation module 136 that the playback area is visible on the client device, the content presentation module 136 is configured to retrieve the preview video from the preview video repository 124 and provide it for playback. In one or more embodiments, the content presentation module 136 sends a message to the client device 105 to buffer the preview video before the playback area becomes visible on the client device 105.

In one or more embodiments, the content presentation module includes functionality to initiate automatic playback of a preview video in the playback area inline with the message stream. For example, the content presentation module 136 is configured to initiate the automatic playback of a preview video on the client device 105. Initiating automatic playback includes triggering the playback of the preview video. Automatic playback occurs when a video plays without any manual instructions from a user or additional processing or waiting for events. In one or more embodiments, the content presentation module 136 initiates automatic playback of the preview video upon verifying that the preview video has buffered or loaded enough of the preview video content such that it can be played without interruption. In one or more embodiments, the content presentation module 136 initiates playback in response to a user event rather than automatically.

In one or more embodiments, the content presentation module includes functionality to automatically play the preview video when a portion of the playback area becomes visible on a display screen of the client device. For example, the content presentation module 136 may be configured to initiate automatic playback of the preview video on the client device 105 when at least a portion of the playback area is visible on the client device 105. The playback area may become visible on the client device when a user scrolls or drags the message stream down or up to reveal additional portions of the message stream with the playback area in them. The playback area may also become visible when a user clicks on a link or other element of the message stream that reveals the playback area. In one or more embodiments, automatic playback is initiated when a designated amount of the playback area is visible, such as at least twenty-five percent of the playback area becoming visible on the client device 105. In one or more embodiments, automatic playback is initiated when any amount of the playback area becomes visible. In other embodiments, automatic playback is initiated only when the playback area is fully visible on the client device 105.

In one or more embodiments, the content presentation module includes functionality to initially play the preview video with audio disabled. For example, the content presentation module 136 may be configured to initiate playback of the preview video on the client device 105 with the audio portion of the playback disabled. While the preview video may contain audio, the presentation module 136 may temporarily mute, disable, lower the volume of, or otherwise remove the audio from the preview video during the playback. In one or more embodiments, the content presentation module 136 provides a visual indication that the audio has been disabled, such as a loudspeaker symbol with a slash through it.

In one or more embodiments, the content presentation module includes functionality to play the preview video with audio enabled in response to a subsequent user input. For example, once the content presentation module 136 has initially begun playing the preview video on the client device 105 with audio disabled or lowered, the content presentation module 136 may receive an indication of a subsequent user input. The content presentation module 136 is configured to play the preview video with audio enabled in response to the subsequent input. The subsequent input may be, e.g., a user clicking on or touching a speaker symbol within the playback area, indicating that the user wishes to hear audio. The subsequent input may also be a user hovering a mouse pointer over the playback area for a designated amount of time. In one or more embodiments, the content presentation module 136 may once again disable audio after receiving indication of further user input.

In one or more embodiments, the content presentation module includes functionality to detect user input indicating a request for the source video. For example, the content presentation module 136 may be configured to detect user input by the client device 105, indicating a request for the source video. The content presentation module 136 may receive the user input as a message, signal, or other indication of the request. The user input on the client device 105 may be, e.g., a clicking event within the playback area during playback of the preview video, a swiping or dragging event within the playback area in a specified direction, a click event of a play button within the playback area, an actuation of a space bar on a keyboard, or any other user input which may indicate a request for the source video.

In one or more embodiments, the content presentation module includes functionality to loop playback of the preview video. For example, the content presentation module 136 may be configured to initiate playback of the preview video in the playback area, and once the playback has reached the end of the preview video, the content presentation module 136 restarts the preview video again without interruption. The content presentation module 136 is configured to play and replay the preview video, or "loop" the preview video, in such a manner continuously until a condition is met to end the loop. In one or more embodiments, the preview video loops until the content presentation module 136 receives user input indicating a request for the source video. The user input acts as the condition for the looping of the preview video to end. In one or more embodiments, the content presentation module 136 loops playback until a predefined number of iterations. For example, the content presentation module 136 may loop playback of the preview video three times, and then stop playback of the preview video. In one or more embodiments, the content presentation module 136 initiates playback of the source video after one or more iterations of the preview video finishes playback.

In one or more embodiments, the content presentation module includes functionality to play the preview video with captions and subsequently display the source video without captions. Captions appear as text within the preview video during playback. In one or more embodiments, the captions represent a text version of the spoken dialogue that occurs in the preview video. The captions may also include text which captures non-spoken audio and sounds which occur in the preview video, such as music being played, a door being shut offscreen, and so on. In one or more embodiments the captions are added to the preview video via metadata or a separate file with the content of the captions corresponding to various playback timings of audio and dialogue events within the video. In one or more embodiments, caption text can be generated by determining the text version of audio. In one or more embodiments, the captions are overlaid on the preview video content, while in other embodiments the captions are hardcoded and already present within the preview video content. For example, a source video may feature a news reporter talking. During the playback of the preview video, captions are provided for the news reporter's spoken words, since the preview video may play without audio enabled. The source video may play without captions, since audio may be enabled for the source video.

In one or more embodiments, the content presentation module 136 may be configured to initiate playback of the preview video within the playback area and display captions for the preview video. For example, upon receiving user input indicating a request for the source video, the content presentation module 136 may be configured to subsequently display the source video for playback without captions. In one or more embodiments, the content presentation module 136 presents an option for the user to turn off captions in the preview video. In one or more embodiments, the content presentation module 136 presents an option for the user to turn on captions in the source video that is subsequently displayed.

In one or more embodiments, the content presentation module includes functionality to receive a request for the source video generated by user input at the client device. For example, the content presentation module 136 may be configured to receive a request for the source video. The request may be generated by user input at the client device 105. Upon the user input action, the client device 105 sends the request to the content presentation module 136, which receives the request. In one or more embodiments, a user input such as clicking within the playback area may indicate a request to enable audio, and a subsequent click may indicate a request for the source video.

In one or more embodiments, the content presentation module includes functionality to provide an advertisement for display prior to playback of the source video. For example, the content presentation module 136 may be configured to receive the request for the source video, retrieve an advertisement from the advertisement repository 126, and then subsequently provide an advertisement for display on the client device 105, prior to playback of the source video. An advertisement can be any content that can be presented on the social media platform 100, including video, audio, still or animated images, text, and/or interactive software.

In one or more embodiments, the content presentation module 136 determines an appropriate advertisement to be displayed, according to criteria for advertisement selection. For example, the content presentation module 136 may determine an appropriate advertisement by analyzing a predetermined list of advertisements to play that correspond to the requested source video, and selecting an advertisement from the list of advertisements. In one or more embodiments, the content presentation module 136 determines an appropriate advertisement by analyzing a context account associated with a user for advertisement preferences. Such advertisement preferences may be retrieved from a context account profile. In one or more embodiments, the content presentation module 136 provides the advertisement for display on the client device 105 in the form of a streaming version of the advertisement. In other embodiments, the content presentation module 136 provides a download or partial download of the advertisement.

In one or more embodiments, the content presentation module 136 is configured to provide an advertisement for display in the middle of the playback of a source video, for a "mid-roll" advertisement. Playback of the source video may be interrupted in order to display an advertisement, and then playback may resume following the completion of the advertisement. In one or more embodiments, the content presentation module 136 can provide an advertisement for display after the playback of a source video has completed, for a "post-roll" advertisement.

For example, the content presentation module 136 may provide an advertisement for playback after the first continuous six seconds of source video playback. After the first six seconds, the advertisement may be provided for automatic playback within the playback area. After the advertisement completes playback, the source video resumes playback from where it was suspended at the six-second mark.

Alternatively, the content presentation module 136 may provide an advertisement for playback upon receiving user input during the playback of the source video. For example, if the user clicks on the playback area during the playback of the source video, the content presentation module 136 may provide the advertisement for playback in the playback area. After the advertisement completes playback, the source video may resume playback from the point at which the user clicked.

In one or more embodiments, the content presentation module includes functionality to receive an advertisement selection by the client device. For example, the content presentation module 136 may be configured to receive an advertisement selection from the client device 105. The advertisement selection may be in the form of a location of the advertisement in the advertisement repository 126, a server address, URL, unique identifier, or other form that allows the content presentation module 136 to locate a specific advertisement.

In one or more embodiments, the content presentation module includes functionality to display the advertisement prior to playing the source video. For example, the content presentation module 136 may be configured to display the advertisement within the playback area visible on the client device 105. In one or more embodiments, the content presentation module 136 displays the advertisement in an advertisement area that replaces or is overlaid on top of the message stream and playback area. The advertisement area may be the full visible space on the client device 105, or a portion of the full visible space. In one or more embodiments, the playback area expands or minimizes to display the advertisement within a specific set of dimensions.

In one or more embodiments, the content presentation module includes functionality to provide the source video for playback in response to the request for the source video. For example, the content presentation module 136 may be configured to provide the source video to the client device 105, in response to the request from the client device 105 for the source video. In one or more embodiments, providing the source video includes providing a location of the source video within the source video repository 120. In one or more embodiments, the content presentation module 136 provides a stream of the source video to the client device 105. In other embodiments, the content presentation module 136 provides a download or partial download of the source video to the client device 105.

In one or more embodiments, the content presentation module includes functionality to initiate playback of the source video in response to the request for the source video. For example, the content presentation module 136 may be configured to initiate the playback of the source video on the client device 105. In one or more embodiments, the content presentation module 136 initiates playback of the source video automatically upon receiving the request for the source video from the client device 105. In other embodiments, the source video playback initiates upon completion of playback of an advertisement. The playback may be in the form of a stream, download, partial download, and/or other form of playing video on the client device 105.

In one or more embodiments, the content presentation module includes functionality to determine that the preview video has completed playback while at least a portion of the playback area was visible on a display screen of the client device. For example, the content presentation module 136 may be configured to determine the completion of playback of the preview video on the client device 105 while at least a portion of the playback area is visible on the display screen of the client device 105. Determining completion of playback of the preview video may include determining that the preview video has reached the end of its playback by, for example, completion of a single playback, completion of a looped playback, or the interruption of playback by user input. The content presentation module 136 may receive a signal when playback of the preview video has completed on the client device 105. The content presentation module 136 may receive a signal when any portion or all of the playback area is hidden on the client device 105. The playback area may become hidden when, for example, a user of the client device 105 scrolls the message stream such that the playback area is no longer visible, or when the user clicks on some element of the message stream that makes the playback area no longer visible.

In one or more embodiments, the content presentation module includes functionality to automatically play the source video in response to the determination. For example, upon determining that the preview video has reached the end of its playback while a portion of the playback area is still visible, the content presentation module 136 may automatically play the full source video in response to the determination. The content presentation module 136 can initiate automatic playback of the source video by streaming, downloading, or partially downloading the source video and executing the playback on the client device 105. The playback may occur automatically without any user input or triggering event aside from the determination that the preview video has ended while the playback area is still visible.

In one or more embodiments, the content presentation module includes functionality to receive a playback command from a user of the client device during playback of the source video. A playback command is any command that requests a change in the playback of a video. Examples of playback commands may include pause, rewind, fast forward, skip, mute audio, present captions, or hiding a portion or all of the playback area. For example, the content presentation module 136 can receive the playback command "pause" from a user of the client device 105 during playback of the source video. Playback commands may be sent from the client device 105 to the content presentation module 136 in the form of a message, signal, or other form of data indicating the playback command has been indicated by a user of the client device 105.

In one or more embodiments, the content presentation module includes functionality to provide, to the social media platform, an indication of the playback command and an associated timestamp indicating when the playback command occurred during playback of the source video, for user engagement analysis. For example, the content presentation module 136 may send to the social media platform 100 an indication of the playback command, designated as a "pause" playback command, from a user of the client device 105. The content presentation module 136 can also send an associated timestamp indicating when the "pause" playback command occurred during playback of the source video. The timestamp may indicate, for example, that a user of the client device 105 selected a "pause" command at two minutes and thirty five seconds into the video.

Both the indication of the playback command and the associated timestamp may be provided by the content presentation module 136 to the social media platform 100 for user engagement analysis. User engagement may be analyzed for the purpose of modifying aspects of the presentation or generation of content for the user. In some embodiments, user engagement activity may provide indications that a first portion of selected content is preferable to a second portion of selected content, as the user engagement has indicated a greater level of interest for the first portion of selected content. In some embodiments, a customized user experience may result from user engagement analysis, or certain portions of content may be removed within the social media platform 100 or the video platform 130.

In one or more embodiments, the content presentation module includes functionality to use the user engagement analysis for generating an additional preview video for subsequent inclusion in message streams of the social media platform. For example, upon receiving one or more indications of user engagement and the associated timestamps, the content presentation module 136 may perform user engagement analysis on the indications of user engagement analysis and associated timestamps. This user analysis may reveal indications of what portions of a source video are interesting to users, and when those interesting portions occurred within the source video. The content presentation module 136 may use the indications of user engagement and associated timestamps to generate an additional preview video, identifying and using the most interesting portions as areas for generating snippets to be used in the preview video. The generated additional preview video may then be chosen for subsequent inclusion in message streams of the social media platform 100. In this way, for example, if a number of users have selected a "pause" playback command at a particular moment in the source video, that information may be used to generate an additional preview video for the source video.

In one or more embodiments, the content delivery presentation includes functionality to receive a user engagement from a user of the client device during playback of the source video. A user engagement may be some action or event related to a user's input or activity. For example, a user engagement may be a user engagement activity, such as selecting a "like" or "favorite" option within a message of a message stream. A user engagement may indicate interest in the source video in a variety of ways. Examples of engagement can include, but are not limited to, a number of rebroadcasts of the source video by the context account, a number of favorites/likes of the source video by the context account, a number of responses to the source video by the context account, a number of mentions or references of the source video by the context account, a number of mentions of other context accounts at certain timestamps of the source video, and/or an amount of any other activity associated with one or more source videos or context accounts. The content presentation module 136 may receive the user engagement from a user of the client device 105 during playback of the source video. User engagements may be sent from the client device 105 to the content presentation module 136 in the form of a message, signal, or other form of data indicating the user engagement has been indicated by a user of the client device 105.

In one or more embodiments, the content presentation module includes functionality to provide, to the social media platform, an indication of the user engagement, and an associated timestamp indicating when the user engagement occurred during playback of the source video, for user engagement analysis. For example, the content presentation module 136 may send to the social media platform 100 an indication of the user engagement, such as designating the source video or message associated with the source video as a "favorite" of the user, from a user of the client device 105. The content presentation module 136 can also send an associated timestamp indicating when the user engagement occurred during playback of the source video. The timestamp may indicate, for example, that a user of the client device 105 selected a "favorite" command at one minute into the video. Both the indication of the user engagement and the associated timestamp are provided by the content presentation module 136 to the social media platform 100 for user engagement analysis.

In one or more embodiments, the content presentation module includes functionality to use the user engagement analysis for generating an additional preview video for subsequent inclusion in message streams of the social media platform. For example, upon receiving one or more indications of user engagement, such as selecting a source video as a "favorite", and the associated timestamps, the content presentation module 136 may perform user engagement analysis on the indications of user engagement analysis and associated timestamps. This user analysis may reveal indications of what portions of a source video are interesting to users, and when those interesting portions occurred within the source video. The content presentation module 136 may use the indications of user engagement and associated timestamps to generate an additional preview video, identifying and using the most interesting portions as areas for generating snippets to be used in the preview video. The generated additional preview video may then be chosen for subsequent inclusion in message streams of the social media platform 100. In this way, for example, the number of users who have selected a source video as a "favorite", and at what particular moments in the source video that selection was made, can have an effect on the generation of a preview video for that source video.

In one or more embodiments, the content presentation module includes functionality to track a measure of user engagement during playback of the preview video. For example, the content presentation module 136 may be configured to receive messages indicating that one or more user engagements have occurred during playback of the preview video. Such user engagements may include, for example, selecting the preview video as a "favorite", selecting the message associated with the preview video as a "favorite", reposting the preview video or message associated with the preview video, or commenting on the preview video. The content presentation module 136 may be configured to track a measure of a user engagement and receive associated timestamps for when the user engagement occurred within the preview video. A measure of a user engagement may be, for example, an amount of user engagements, a frequency of user engagements, how recent user engagements are, a weight of user engagements over a period of time, and/or a weight of user engagements for a popularity or celebrity index of a context account.

In one or more embodiments, the content presentation module includes functionality to provide, to the social media platform, the measure of user engagement. For example, upon tracking the measure of user engagement, the content presentation module 136 may be configured to provide the measure of user engagement to the social media platform 100. Providing the measure of user engagement may include the content presentation module 136 providing the indication of the user engagement with an associated timestamp indicating when the user engagement occurred during playback of the preview video. In some embodiments, additional information may be provided to the social media platform 100, including the number of users who have indicated user engagement during playback of a preview video.

In one or more embodiments, the content presentation module includes functionality to compare the measure of user engagement of the preview video with measures of user engagement of other preview videos for determining which preview video to subsequently include in message streams of the social media platform. For example, the content presentation module 136 may be configured to compare the measure of user engagement for the preview video, such as reposting the preview video, with the measures of user engagement of other preview videos, such as reposting the other preview videos. The content presentation module 136 may then use the comparison for determining which preview video to subsequently include in message streams of the social media platform 100. For example, if a first preview video has had more repostings than other preview videos for the same source video, then the content presentation module 136 may determine that the first preview video should be selected for inclusion in message streams. Another example would be the amount of "favorite" indications that have been made for a preview video. If one preview video has more "favorites" than other preview videos, that preview video may be selected for inclusion within message streams.

In one or more embodiments, the content presentation module includes functionality to receive, from the client device, a subsequent user input from a first context account associating a second context account with the source video, and an associated timestamp indicating when the subsequent user input occurred in the source video. For example, the content presentation module 136 may be configured to receive a user input from a user of the client device 105, associating a second context account with the source video. This may indicate, for example, a "mention", such as when a user tags or uses the username of a second user in relation to the source video. In some embodiments, this may occur within a thread of the message stream associated with the source video, or within a reposting of the source video. In addition to receiving the subsequent user input, the content presentation module 136 may be configured to also receive the associated timestamp indicating when the subsequent user input occurred in the source video. For example, if a user mentions a second user in relation to a source video, a timestamp may indicate when, during the playback of the source video, that user mentioned the second user. A user may, for example, be viewing a source video showing an interview of three people. The user may "tag" or "mention" the second person to be interviewed at the time in the source video when the interview of the second person begins. The content presentation module 136 thus receives the indication of the tagging of the second person to be interviewed, as well as the associated timestamp of when the person was tagged in the source video.

In one or more embodiments, the content presentation module includes functionality to store the association of the second context account and the associated timestamp. The content presentation module 136 may be configured to store both the indication of an association with a second user account, and the associated timestamp indicating when during playback of the source video the association occurred. The association and associated timestamp may be stored within the social media platform 100, the video platform 130, a repository, the client device 105, or other location. For example, if one user mentions a second user during playback of the source video, in relation to the source video, then the content presentation module 136 may store both that association and its associated timestamp within a repository of the video platform 130. Upon storing the association and the associated timestamp, they may be made use of in a variety of ways. For example, the content presentation module 136 may use the association and the associated timestamp to perform user engagement analysis that is used for the generation of additional preview videos. As another example, the content presentation module 136 may use the association and the associated timestamp to select one preview video over other preview videos for inclusion in a message stream. As another example, the content presentation module 136 may use the association and the associated timestamp to determine at what timestamp within a source video playback should be interrupted for an advertisement to be displayed.

Figure 5:
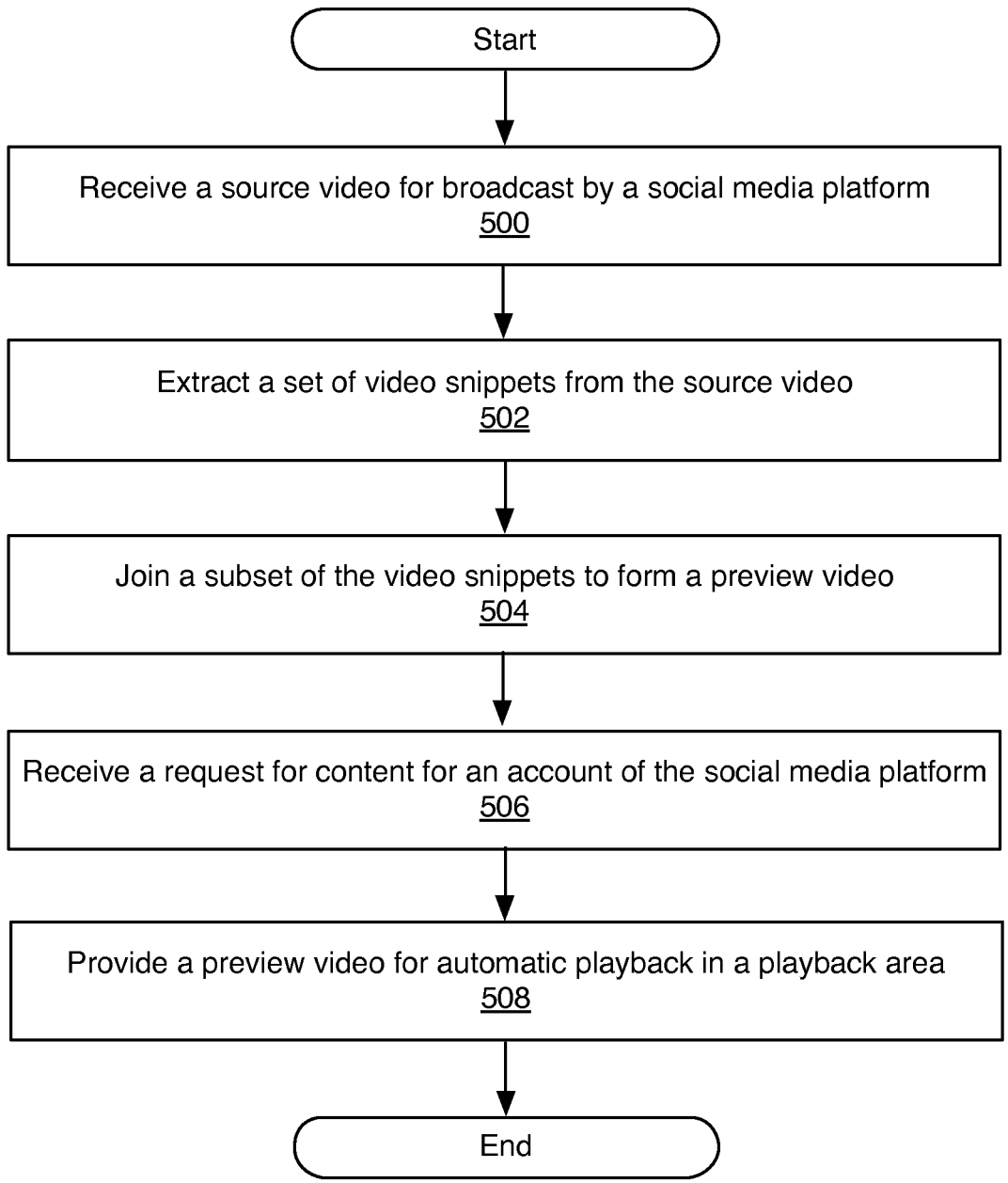
FIGS. 5-7 show flowcharts in accordance with one or more embodiments.

FIG. 5 shows a flowchart of a method of preview generation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope.

In step 500, a source video for broadcast by a social media platform is received. The source video may be a video file or location to a video file, and may be compatible with a social media platform. The source video may be playable within a social media platform or client device.

In step 502, a set of video snippets is extracted from the source video. The set of video snippets may be extracted by identifying video snippets and storing them within a separate video file. For example, within a two-minute video, a video snippet may be a two-second, continuous, discrete portion from the beginning of the source video. The set of video snippets may be extracted from the source video in one or more ways. The video snippets may be stored as a series of video files that are separate and distinct from the source video file, with each video file designating one video snippet. The video snippets may be stored as a single video file, with the video file containing the set of video snippets arranged in a sequential or predefined fashion.

In step 504, a subset of the video snippets is joined to form a preview video. The subset of the video snippets may be joined by combining the video snippets into a single preview video, such that the video snippets may play in a continuous and/or sequential order. In one or more embodiments, the preview video may include a single video snippet rather than several video snippets. The subset of the video snippets may be selected by choosing the first snippets to fill an allotted amount of time designated for a preview video. The subset of the video snippets may be selected by ranking the video snippets or performing analysis of the video snippets. The video snippets may be joined by creating a video container for the preview video and placing the snippets within the video container. The video snippets may be joined by placing separate video snippet files in a playback area to be played back-to-back without interruption.

In step 506, a request for content for an account of the social media platform is received. The request can be the form of a message, signal, or transfer of data. The request may indicate, for example, that a user has opened a social media application that is set to display content for a context account associated with that user. In one or more embodiments, the request for content can include a user event, such as opening an application, clicking, scrolling, touching, or other input from a user.

In step 508, the preview video is provided for automatic playback in a playback area. Providing the preview video may include providing a location of the preview video within a repository. The preview video may be provided by initiating a stream of the preview video. The preview video may be provided as a download or partial download of the preview video. The content can appear inline within a display of the message stream, within a playback area.

Figure 6:
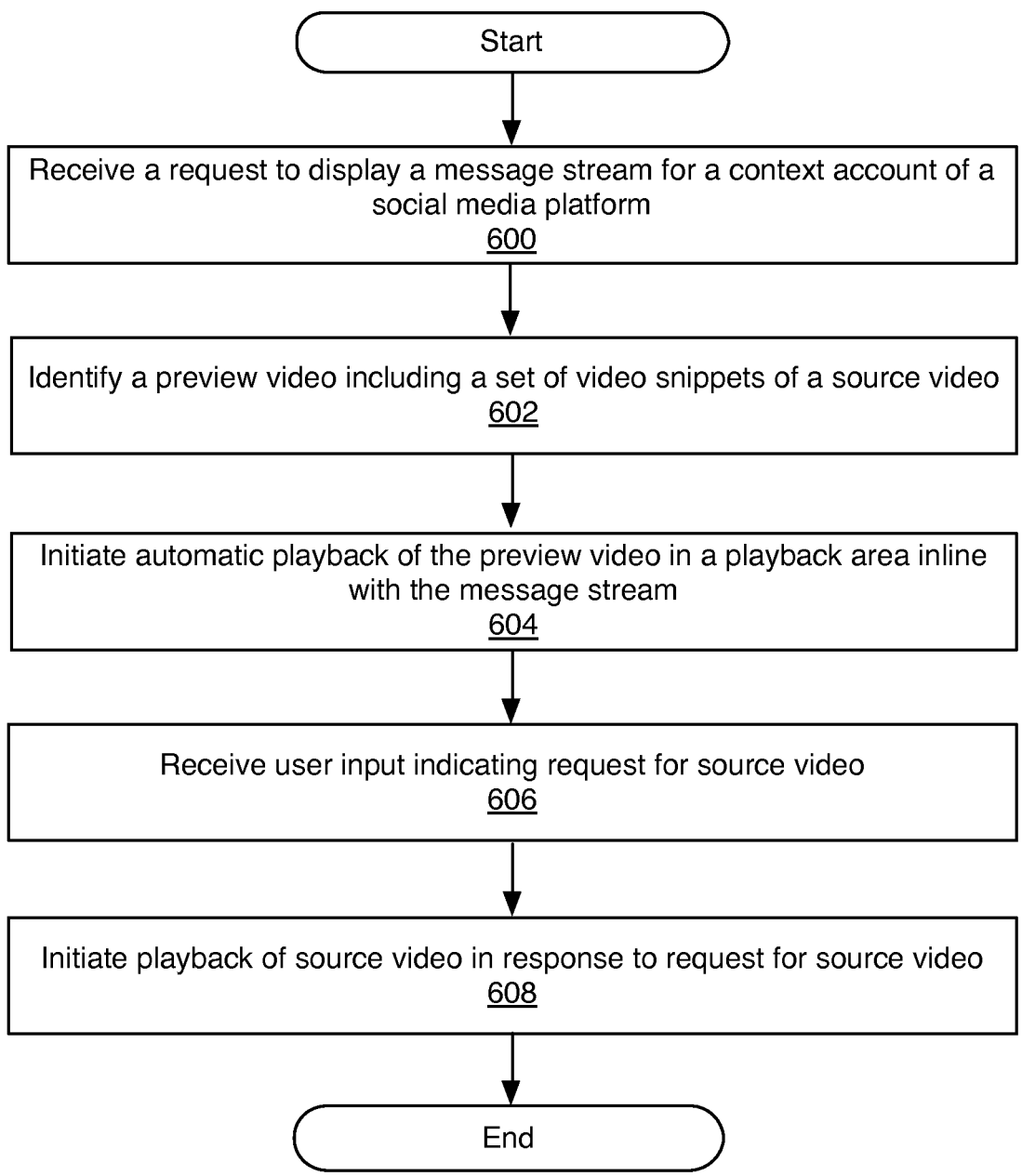

FIG. 6 shows a flowchart of a method for video presentation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 6 should not be construed as limiting the scope.

In step 600, a request to display a message stream for a context account of a social media platform is received. The request may indicate user input has been received indicating that the user requests a message to be displayed for a context account of a social media platform. For example, a user may choose to interact with a portion of a social media platform that displays a customized message stream for that user. By clicking on the section of the social media platform that allows the message stream to be displayed, the user triggers a message that is sent to the video platform, indicating that the user is requesting a message stream to be displayed for a context account associated with the user, on the social media platform.

In step 602, a preview video including a set of video snippets of a source video is identified. The preview video includes a set of video snippets of a source video, and may be made up of a collection of video snippets in subsequent order. The preview video may be a subset of the source video. A source video may be a video that has been used to create a preview video. The source video and the preview video may be associated with a message included with the message stream. This association may be, for example, a piece of metadata, server address, repository location, or unique identifier indicating that the message is associated with the source video or preview video. The preview video may be identified by using the association, such as a repository location, to retrieve the preview video from its location.

In step 604, automatic playback of the preview video in a playback area inline with the message stream is initiated. The preview video may be placed within the playback area that was displayed on the display screen of the client device, and the placement may occur in the playback area such that the playback area and preview video are located inline within the message stream. Automatic playback of the preview video is initiated, requiring no manual input from a user or other triggering event to initiate playback. In one or more embodiments, the automatic playback occurs when at least some portion of the playback area is visible on the display screen of the client device.

In step 606, user input indicating a request for the source video is received. For example, a user may click on the preview video, indicating that the user wishes to see the full source video upon which the preview video is a subset of. The user input can be detected through a message being sent indicating a user input.

In step 608, playback of the source video is initiated in response to the request for the source video. The source video playback may occur in the same playback area inline with the message stream, and may replace the playback of the preview video. During playback of the source video, a user may continue to input commands or interact with the message stream and social media platform in a variety of ways.

Figure 7:
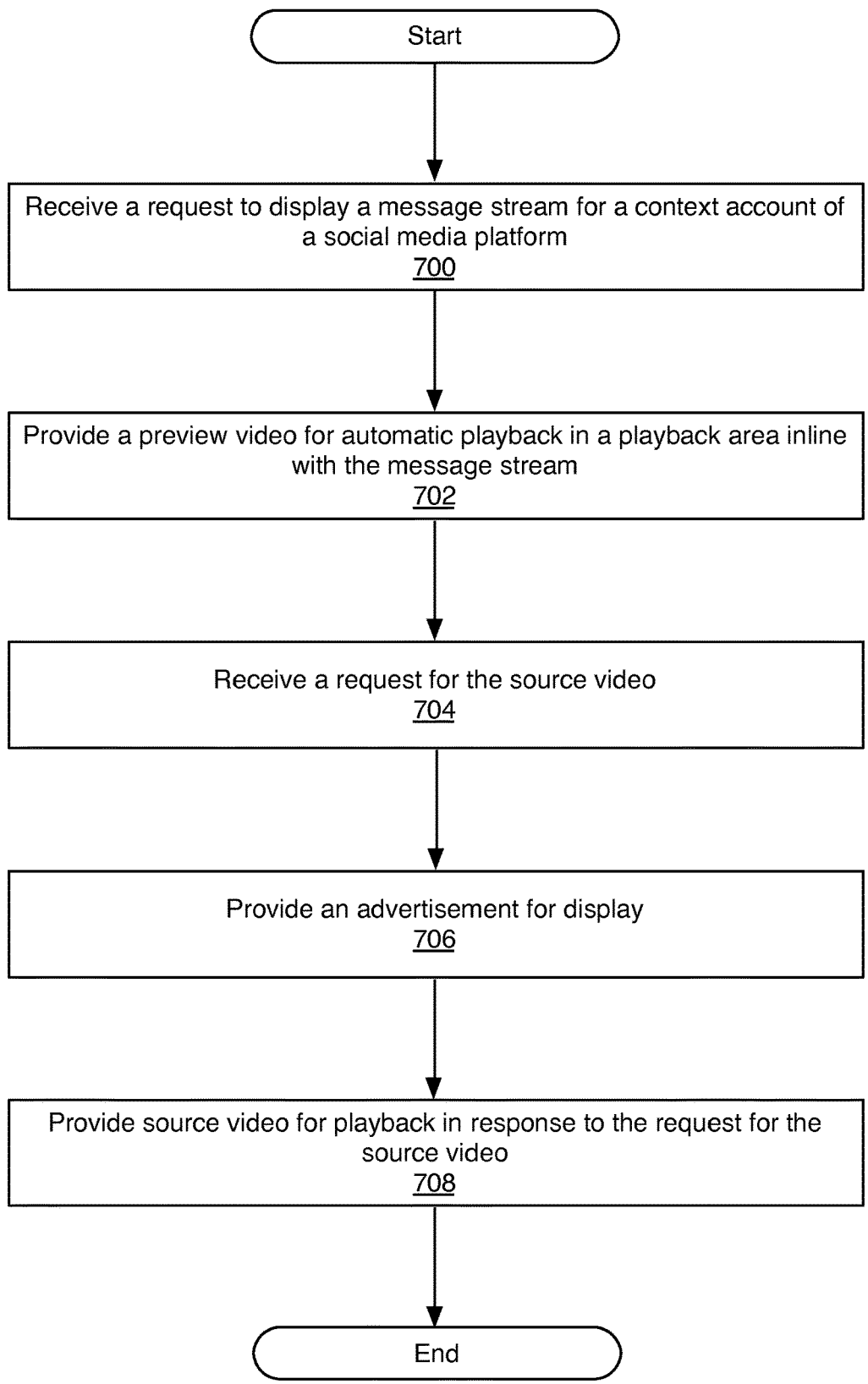

FIG. 7 shows a flowchart of a method for video delivery. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 7 should not be construed as limiting the scope.

In step 700, a request to display a message stream for a context account of a social media platform is received. The request may indicate user input has been received indicating that the user requests a message to be displayed for a context account of a social media platform. For example, a user may choose to interact with a portion of a social media platform that displays a customized message stream for that user. By clicking on the section of the social media platform that allows the message stream to be displayed, the user triggers a message that is sent to the video platform, indicating that the user is requesting a message stream to be displayed for a context account associated with the user, on the social media platform.

In step 702, a preview video is provided for automatic playback in a playback area inline with the message stream. Once the request to display a message stream has been received, a preview video is provided within a playback area inline with the message stream. The preview video includes a set of video snippets of a source video. In one or more embodiments, the preview video may be a subset of the source video, and may comprise discrete video snippets joined together into a continuous video. The source video and the preview video may be associated with a message included in the message stream.

In step 704, a request for the source video is received. The request may be in the form of user input on the client device, indicating that the user wishes to receive the source video. For example, the user may click on or touch the preview video during playback of the preview video, indicating that the user wishes to view the source video that the preview video is a subset of.

In step 706, an advertisement is provided for display. Upon receiving the request for the source video, an advertisement may be displayed as an interstitial advertisement to be played in between the preview video and the source video. The advertisement may be in the form of video, audio, text, interactive software, or other forms of content. In some embodiments, a user may be able to send user input such as playback commands for the advertisement, user engagement activity, or other ways of interacting with the advertisement. The advertisement may appear in the same playback area inline with the message stream. The advertisement may also replace the message stream temporarily during its display.

In step 708, a source video is provided for playback in response to the request for the source video. In one or more embodiments, the source video is provided immediately after the request for the source video is received, with no advertisement being displayed. In one or more embodiments, the source video is provided after the advertisement is displayed and has completed. In one or more embodiments, user input may be received indicating a request to skip the advertisement, whereupon the source video is provided. The source video may be displayed in the playback area inline with the message stream. In one or more embodiments, the source video may be displayed such that it replaces the message stream during its playback. A user may continue to send inputs in a number of ways, such as playback commands, user engagement, and more.

Figure 8:
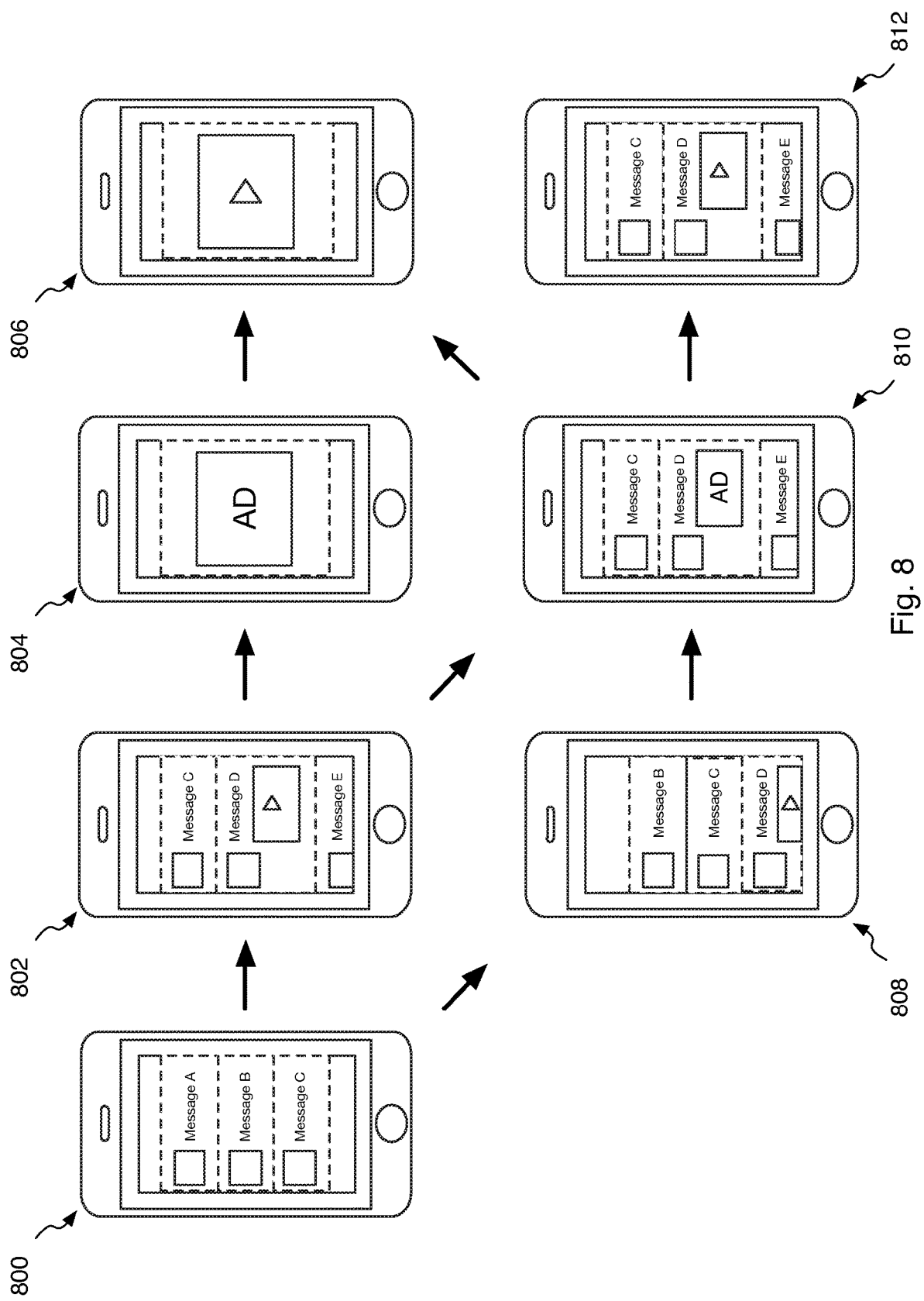
FIG. 8 shows an example user interface and playback flow for a user.

FIG. 8 illustrates an example user interface and playback flow for a user. In a user interface 800, a message stream is displayed on a device. The device may be executing an application for a social media platform. The application may be displaying a message stream for a context account associated with the user on the social media platform. The display of the message stream may have been requested by the user logging in to the social media platform, the user touching a button for displaying the message stream, or some other user input or event. The message stream is thus displayed on user interface 800. A stream of messages (e.g., message A, message B, and message C) may appear within the message stream. Each of the messages may include images, text, and/or other content. For example, message A may include a message from a second context account that the user is associated with (e.g., has decided to "follow").

In a user interface 802, the message stream may have been scrolled down such that at least a portion of new messages are displayed. For example, new messages message D and message E are displayed (while some or all of the previously displayed messages like message A and message B may no longer be displayed). After at least a portion of the message D is displayed, a playback area within message D may become at least partially visible, inline within the message D and the message stream. The playback area may be designated for a video. In some embodiments, a preview video associated with the source video may be immediately provided upon a display of the playback area for automatic playback within the playback area. In other embodiments, the preview video is provided upon an event (e.g., upon a user click event, upon a user scrolling proximate to the message in the message stream).

In a user interface 804, after the preview video has been displayed, the source video may be displayed. Before displaying the source video, the display of the message stream may be temporarily replaced by a full-screen advertisement. The advertisement may have been selected in a number of ways. For example, the advertisement may have been selected based on user demographics, user engagement activity, or some other criteria.

In a user interface 806, after the advertisement has completed playback, the source video may be provided to replace the advertisement. The source video may be provided in full-screen format. Upon the source video completing playback or upon the user provided input to interrupt the playback, the user interface may return to displaying the message stream and awaiting further user input.

In a user interface 808, a display following the user interface 800 may be displayed. The playback area of message D may be partially visible in response to a scroll operation. Although the playback area is only partially visible, the preview video still may be capable of automatically playing within the partially visible playback area.

In a user interface 810, after the preview video is displayed in user interface 802 or 808, an advertisement may be provided. Rather than displaying the advertisement fullscreen, the advertisement may be displayed within the same playback area that is already visible.

In a user interface 812, after the advertisement in user interface 810 has completed playback, a source video may be provided for automatic playback. Rather than a full-screen source video, the source video may be provided within the playback area that is already visible. After the source video completes playback, or after user input is received to interrupt playback, the user interface may await further instructions from the user, such as scrolling further down in the message stream. In another embodiment, the user interface 806 may be displayed following the inline advertisement display of user interface 810, such that the source video is displayed in fullscreen.

During the playback of the source video at user interface 806 or user interface 812, a user may continue to provide input, interaction, or engagement. For example, the user may select the video as a "favorite" by selecting a user interface control. Selecting the video as a "favorite" may register as user engagement activity that may be sent for user engagement analysis. The user engagement analysis may involve monitoring or analyzing user engagement for selecting video snippets at noteworthy or high interest sections of the source video, designated by areas where users have shown increased user engagement activity. For example, one or more users selecting a "favorite" option for a source video depicting a football game, during a moment where a scoring play has occurred, may lead to a preview video being generated that contains that scoring play as part of the preview.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

In one or more embodiments, a method for video generation and/or video presentation (e.g., in a social media platform) includes steps 500-508 of FIG. 5, steps 600-608 of FIG. 6, and/or steps 700-708 of FIG. 7, performed either sequentially or in parallel. For example, steps 500-508 can be first executed, followed by the execution of steps 600-608 of FIG. 6, and then followed by the execution of steps 700-708 of FIG. 7. In another example, steps 500-508 can be first executed, followed by the execution of steps 600-608 of FIG. 6 and steps 700-708 of FIG. 7 in parallel. It should be appreciated that in one or more embodiments, the steps of one of FIGS. 5-7 can be executed by the same or different modules from the modules executing the steps of any of the other of FIGS. 5-7.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 9:
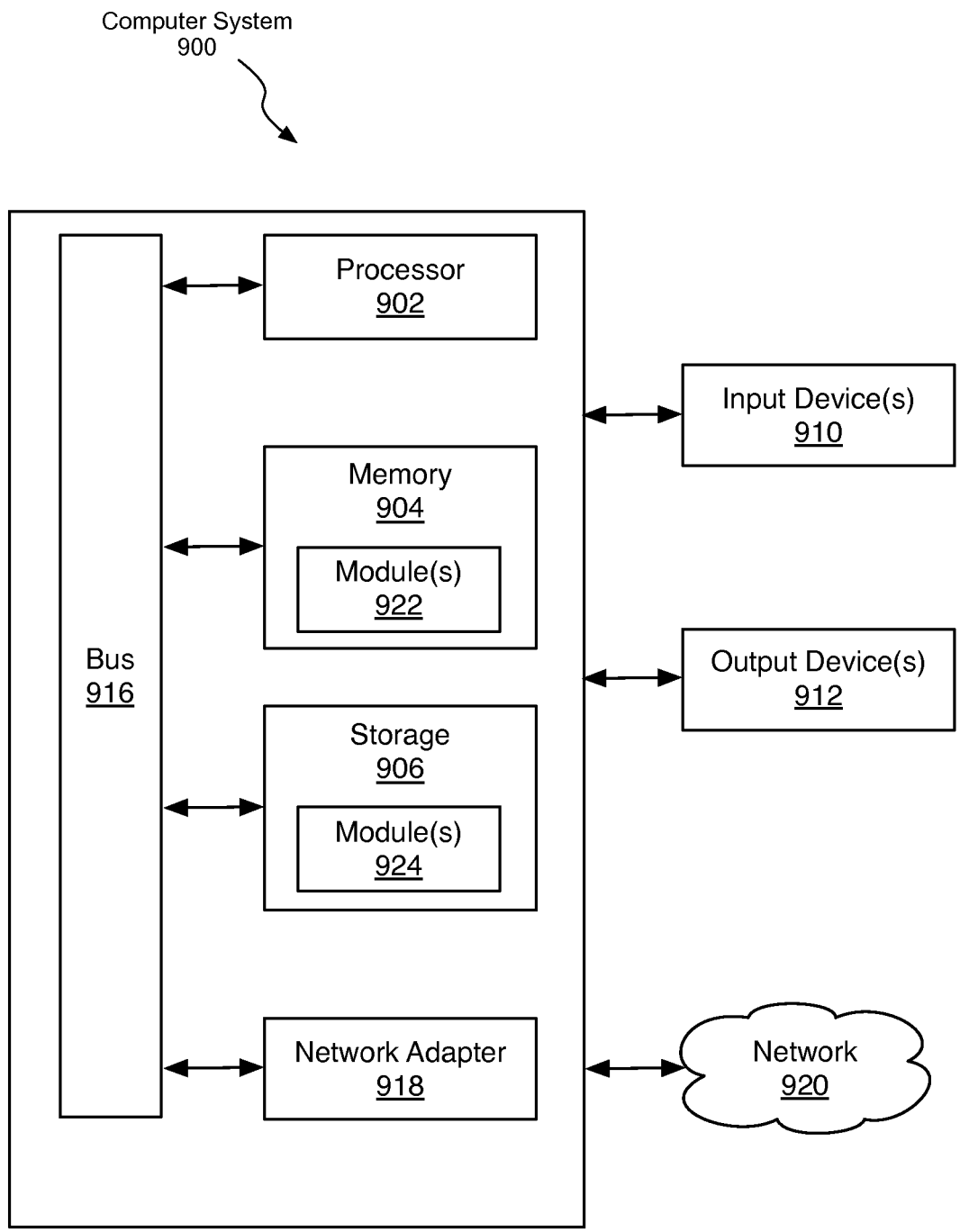
FIG. 9 shows a computer system in accordance with one or more embodiments.

For example, as shown in FIG. 9, the computing system 900 may include one or more computer processor(s) 902, associated memory 904 (e.g., random access memory (RAM), cache memory, flash memory, etc.), one or more storage device(s) 906 (e.g., a hard disk, an optical drive such as a compact disk (CD) drive or digital versatile disk (DVD) drive, a flash memory stick, etc.), a bus 916, and numerous other elements and functionalities. The computer processor(s) 902 may be an integrated circuit for processing instructions. For example, the computer processor(s) may be one or more cores or micro-cores of a processor.

In one or more embodiments, the computer processor(s) 902 may be an integrated circuit for processing instructions. For example, the computer processor(s) 902 may be one or more cores or micro-cores of a processor. The computer processor(s) 902 can implement/execute software modules stored by computing system 900, such as module(s) 922 stored in memory 904 or module(s) 924 stored in storage 906. For example, one or more of the modules described in FIG. 1 (e.g., the preview generation module 132 and/or the content presentation module 136) can be stored in memory 904 or storage 906, where they can be accessed and processed by the computer processor 902. In one or more embodiments, the computer processor(s) 902 can be a special-purpose processor where software instructions are incorporated into the actual processor design.

The computing system 900 may also include one or more input device(s) 910, such as a touchscreen, keyboard, mouse, microphone, touchpad, electronic pen, or any other type of input device. Further, the computing system 900 may include one or more output device(s) 912, such as a screen (e.g., a liquid crystal display (LCD), a plasma display, touchscreen, cathode ray tube (CRT) monitor, projector, or other display device), a printer, external storage, or any other output device. The computing system 900 may be connected to a network 920 (e.g., a local area network (LAN), a wide area network (WAN) such as the Internet, mobile network, or any other type of network) via a network interface connection 918. The input and output device(s) may be locally or remotely connected (e.g., via the network 920) to the computer processor(s) 902, memory 904, and storage device(s) 906.

One or more elements of the aforementioned computing system 900 may be located at a remote location and connected to the other elements over a network 920. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIG. 1) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 5-7). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

The invention claimed is:

1. A method comprising:
   displaying a message stream for an account of a social media platform, at least a first message of the message stream associated with a source video configured for being played in a playback area within the displayed message stream;
   determining that a preview video initiation condition is satisfied; and
   playing, in the playback area and in response to the determination, a preview video generated from the source video, the preview video comprising a selection of at least one video snippet from the source video, the video snippet having been selected by a media server monitoring user interaction by users viewing the source video, the selection having been done based on registration, during playback of the source video, of inputs made by at least some of the users using a playback control for the source video, the playback control controlling the playback of the source video, the at least one video snippet having been selected based on a timing of when the inputs occur during the playback of the source video.

2. The method of claim 1, wherein the preview video is a first preview video, the method further comprising playing a second preview video of the source video, the second preview video different from the first preview video, determining user interaction with the first and second preview videos, respectively, and selecting one of the first and second preview videos based on the determination.

3. The method of claim 1, wherein the playback control includes at least one selected from the group consisting of: pause, rewind, fast forward, skip, increase or decrease volume, mute audio, and present captions.

4. The method of claim 1, wherein the preview video initiation condition is satisfied when a designated amount of the playback area is visible.

5. The method of claim 1, wherein multiple events included in the source video have been identified, further comprising ranking the multiple events according to user interest criteria, wherein the user interest ranking criteria are taken into account in selecting the at least one video snippet for the preview video.

6. The method of claim 5, wherein the user interest ranking criteria include a predefined list of recognized visual elements and associated levels of interest importance.

7. The method of claim 5, wherein a weight of the user interactions per unit time period of the source video is calculated and used in ranking the multiple events.

8. The method of claim 1, wherein selection of the at least one video snippet comprises assignment of a high interest timestamp to a corresponding location of the source video, the method further comprising playing the source video after the selection, and presenting an advertisement at the location of the high interest timestamp.

9. The method of claim 1, wherein a set of transcoded video segments from the source video have been identified, the method further comprising modifying a length of the at least one video snippet to correspond to a length of the set of transcoded video segments.

10. The method of claim 1, wherein multiple video snippets are selected from the source video and stored as a single file for the preview video.

11. The method of claim 1, wherein analysis of the source video for at least one scene change in contents of the source video is also taken into account in selecting the at least one video snippet from the source video.

12. The method of claim 1, wherein analysis of the source video for at least one black scene or crossfade in contents of the source video is also taken into account in selecting the at least one video snippet from the source video.

13. The method of claim 1, wherein analysis of the source video for detection of a set of visual elements in contents of the source video is also taken into account in selecting the at least one video snippet from the source video.

14. The method of claim 1, wherein metadata of the source video is identified in a separate metadata file associated with the source video, and wherein the metadata is also taken into account in selecting the at least one video snippet from the source video.

15. The method of claim 1, wherein closed captioning data of the source video is identified in a file containing closed captioning data for the source video, and wherein the closed captioning data is also taken into account in selecting the at least one video snippet from the source video.

16. The method of claim 1, wherein video snippet timestamps of the source video are received from a provider of the source video, and wherein the video snippet timestamps are also taken into account in selecting the at least one video snippet from the source video.

17. The method of claim 1, wherein user demographics of a user are received, and wherein the user demographics are also taken into account in selecting the at least one video snippet from the source video.

18. The method of claim 1, wherein the source video is associated with a category, and wherein the category is also taken into account in selecting the at least one video snippet from the source video.

19. A computer program product tangibly embodied in a non-transitory storage medium, the computer program product including instructions that when executed cause a processor to perform operations comprising:
    displaying a message stream for an account of a social media platform, at least a first message of the message stream associated with a source video configured for being played in a playback area within the displayed message stream;
    determining that a preview video initiation condition is satisfied; and
    playing, in the playback area and in response to the determination, a preview video generated from the source video, the preview video comprising a selection of at least one video snippet from the source video, the video snippet having been selected by a media server monitoring user interaction by users viewing the source video, the selection having been done based on registration, during playback of the source video, of inputs made by at least some of the users using a playback control for the source video, the playback control controlling the playback of the source video, the at least one video snippet having been selected based on a timing of when the inputs occur during the playback of the source video.

20. A system comprising:
    a processor;
    a video output device; and
    a content presentation module executed on the processor, wherein the content presentation module:
    displays a message stream for an account of a social media platform on the video output device, at least a first message of the message stream associated with a source video configured for being played in a playback area within the displayed message stream;
    determines that a preview video initiation condition is satisfied; and
    plays, in the playback area and in response to the determination, a preview video generated from the source video, the preview video comprising a selection of at least one video snippet from the source video, the video snippet having been selected by a media server monitoring user interaction by users viewing the source video, the selection having been done based on registration, during playback of the source video, of inputs made by at least some of the users using a playback control for the source video, the playback control controlling the playback of the source video, the at least one video snippet having been selected based on a timing of when the inputs occur during the playback of the source video.

* * * * *